United States Patent
Liu et al.

(10) Patent No.: US 12,183,955 B2
(45) Date of Patent: Dec. 31, 2024

(54) SEALING STRUCTURE FOR BATTERY

(71) Applicant: DAIKIN INDUSTRIES, LTD., Osaka (JP)

(72) Inventors: Jihong Liu, Osaka (JP); Takahisa Aoyama, Osaka (JP); Hayato Tsuda, Osaka (JP); Masamichi Sukegawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 559 days.

(21) Appl. No.: 17/525,575

(22) Filed: Nov. 12, 2021

(65) Prior Publication Data

US 2022/0069394 A1 Mar. 3, 2022

Related U.S. Application Data

(63) Continuation of application No. PCT/JP2020/018297, filed on Apr. 30, 2020.

(30) Foreign Application Priority Data

May 13, 2019 (JP) ................. 2019-090380

(51) Int. Cl.
*H01M 50/552* (2021.01)
*H01M 50/172* (2021.01)
*H01M 50/188* (2021.01)
*H01M 50/193* (2021.01)

(52) U.S. Cl.
CPC ....... *H01M 50/552* (2021.01); *H01M 50/172* (2021.01); *H01M 50/188* (2021.01); *H01M 50/193* (2021.01)

(58) Field of Classification Search
CPC ............. H01M 50/552; H01M 50/172; H01M 50/193; H01M 50/188
See application file for complete search history.

(56) References Cited

FOREIGN PATENT DOCUMENTS

| JP | 9-153351 A | 6/1997 |
|----|------------|--------|
| JP | 2008-251213 A | 10/2008 |
| WO | 2018/159180 A1 | 9/2018 |

OTHER PUBLICATIONS

International Search Report of corresponding PCT Application No. PCT/JP2020/018297 dated Jul. 14, 2020.
European Search Report of corresponding EP Application No. 20 80 5615.0 dated May 15, 2023.
International Preliminary Report of corresponding PCT Application No. PCT/JP2020/018297 dated Nov. 25, 2021.

*Primary Examiner* — Jane J Rhee
(74) *Attorney, Agent, or Firm* — Global IP Counselors, LLP

(57) ABSTRACT

A sealing structure for a battery includes a plate shaped member having a through hole, a polymer molding, and an electrode. The polymer molding has a tube portion provided along an entire edge of the through hole and a base portion provided on the tube portion. The electrode has a column portion disposed on an inner periphery of the tube portion and a plate portion provided on the column portion. A back surface of the plate shaped member contacts a front surface of the base portion. A front surface of the plate portion contacts a back surface of the base portion. The back surface of the plate shaped member has an annular first projection provided around the through hole and projecting toward the base portion. The front surface of the plate portion has an annular second projection provided around the through hole and projecting toward the base portion.

19 Claims, 19 Drawing Sheets

SEALING STRUCTURE FOR BATTERY

CROSS-REFERENCE TO RELATED APPLICATIONS

This is a continuation of International Application No. PCT/JP2020/018297 filed on Apr. 30, 2020, which claims priority to Japanese Patent Application No. 2019-090380, filed on May 13, 2019. The entire disclosures of these applications are incorporated by reference herein.

BACKGROUND

Field of Invention

The present disclosure relates to a sealing structure for a battery.

Background Information

For example, to reduce leakage of an electrolyte or any other substance from a battery, the battery may include an insulating gasket interposed between an electrode external terminal and a sealing plate to provide good sealing performance (see, for example, Japanese Unexamined Patent Publication No. 2008-251213).

SUMMARY

A sealing structure for a battery according to a first aspect includes a plate shaped member having a through hole, a polymer molding, and an electrode. The polymer molding has a tube portion and a base portion. The tube portion is provided along an entire edge of the through hole. The base portion is provided on the tube portion. The electrode has a column portion and a plate portion. The column portion is disposed on an inner periphery of the tube portion. The plate portion is provided on the column portion. A back surface of the plate shaped member is in contact with a front surface of the base portion of the polymer molding. A front surface of the plate portion of the electrode is in contact with a back surface of the base portion of the polymer molding. The back surface of the plate shaped member has an annular first projection provided around the through hole and projecting toward the base portion of the polymer molding. The front surface of the plate portion of the electrode has an annular second projection provided around the through hole and projecting toward the base portion of the polymer molding. Values $\alpha$ and $\beta$ are expressed by the following formula (1) $\alpha=(h1+h2)/H$, $\beta=d/H$. Values $\alpha$ and $\beta$ satisfy the following formula (2)

$$\left. \begin{array}{l} 0.1 \leq \alpha \leq 0.7, \; \beta \geq 0 \\ 0.7 < \alpha \leq 1.4, \; \beta \geq (5\alpha - 2)/3 \end{array} \right\} \quad (2)$$

where h1 and h2 respectively represent heights of the first and second projections, d represents a distance between the first and second projections, and H represents a thickness of the base portion of the polymer molding.

DETAILED DESCRIPTION OF EMBODIMENT(S)

First Embodiment

Direction

Figure 1:
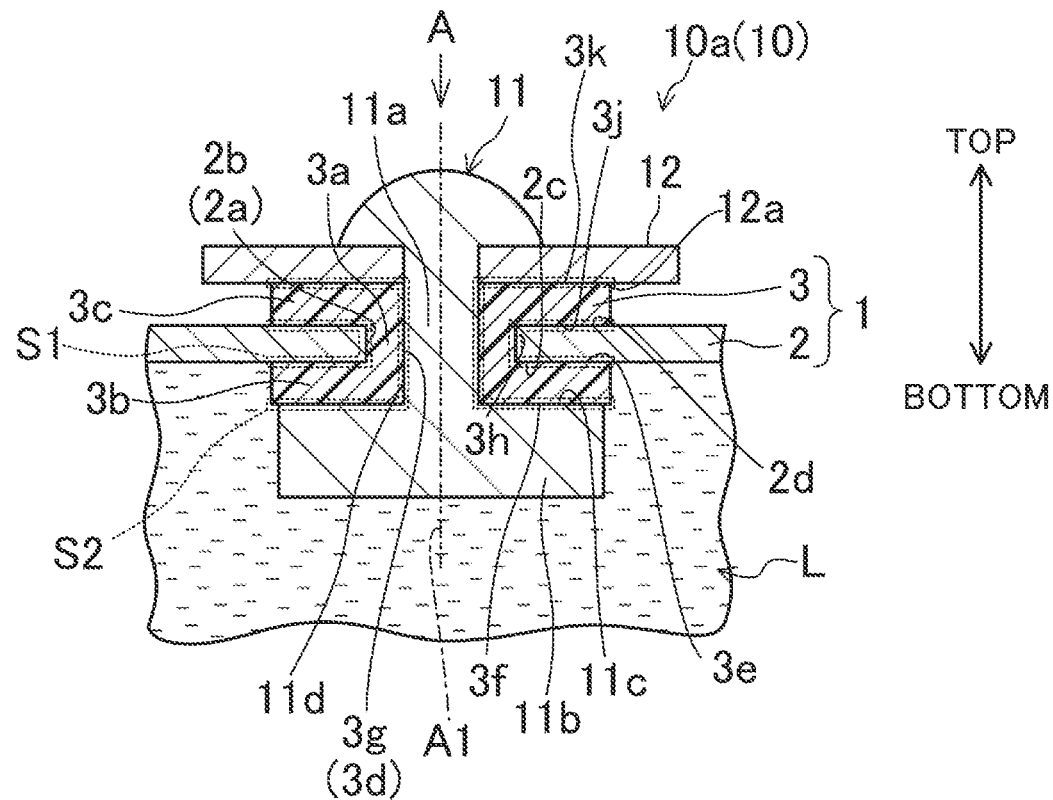
FIG. 1 illustrates a sealing structure for a lithium ion battery.
Figure 2:
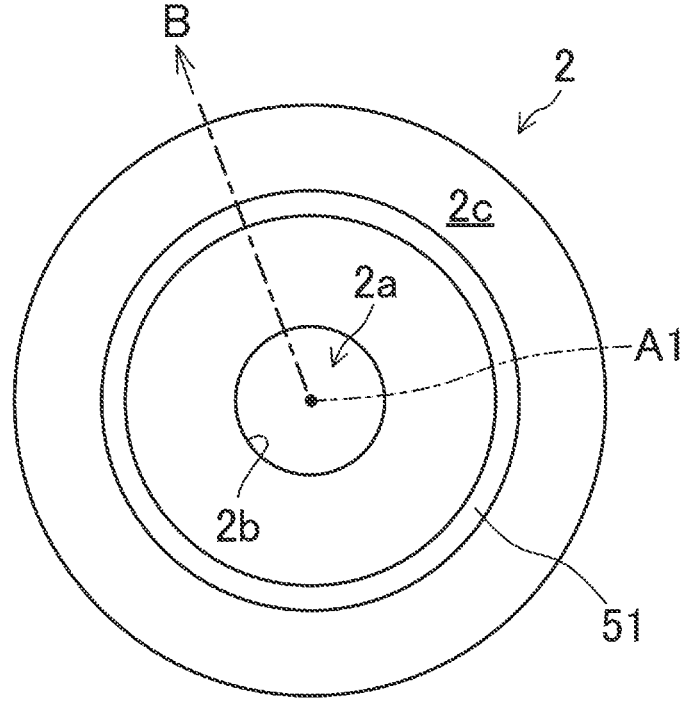
FIG. 2 illustrates a bottom view of a metal lid.

As illustrated in FIGS. 1 and 2, the direction of the axis (A1) of a through hole (2a) of a metal lid (2) is referred to as the "through direction (A)," and a radial direction of the through hole (2a) as the "radial direction (B)." For the sake of convenience, upper and lower sides of FIG. 1 are referred to as the "upper side" and "lower side," respectively. The upper and lower sides are also referred to as the "front side" and "back side," respectively.

Sealing Structure

FIG. 1 illustrates a sealing structure (10a) for a lithium ion battery (10). The sealing structure (10a) includes a seal (1) and an electrode (11).

Configuration of Seal

The seal (1) includes the metal lid (2), which is a metal member corresponding to the above member (2), and a polymer molding (3). The metal lid (2) and the polymer molding (3) are fixed to each other without being bonded together.

Metal Lid

FIG. 2 illustrates a bottom view of the metal lid (2). This metal lid (2) is made of a metal, such as aluminum. In this example, as illustrated in FIG. 2, the metal lid (2) is a plate-shaped member having the through hole (2a). More specifically, the metal lid (2) is in the shape of a circular washer having the circular through hole (2a).

Polymer Molding

As illustrated in FIG. 1, the polymer molding (3) has a tubular portion (hereinafter referred to as the "tube portion (3a)"), a lower plate-shaped portion (hereinafter referred to as the "base portion (3b)"), and an upper plate-shaped portion (hereinafter referred to as the "upper portion (3c)"). The tube portion (3a) is provided along the entire edge (2b) of the through hole (2a). The tube portion (3a) has a hole (3d) coaxial with the through hole (2a). The base portion (3b) is provided near one end of the tube portion (3a). The upper portion (3c) is provided near the other end of the tube portion (3a). The polymer molding (3) has an axisymmetric shape (the shape of a rotating object) that is rotationally symmetric about the axis (A1). The axisymmetric shape is an example. The polymer molding (3) may have a nonaxisymmetric shape.

The polymer molding (3) is fixed to the edge (2b) of the through hole (2a) (see FIG. 1). Specifically, in this embodiment, the seal (1) is formed by insert molding. In the insert molding, a resin, which is a material of the polymer molding (3), is injected around the metal lid (2) inserted in a molding die. Thus, the metal lid (2) and the polymer molding (3) are integrated together. In other words, the metal lid (2) and the polymer molding (3) are an integrally molded article. In this example, the metal lid (2) and the polymer molding (3) are fixed to each other without being bonded together. In this example, the raw material of the polymer molding (3) is a fluoric resin, more specifically, a copolymer of tetrafluoroethylene and perfluoroalkyl vinyl ether (PFA for short). The reason why this resin is used as the raw material of the polymer molding (3) will be described below.

Configuration of Electrode

The electrode (11) has a columnar portion (hereinafter referred to as the "column portion (11a)") and a plate-shaped portion (hereinafter referred to as the "plate portion (11b)"). The column portion (11a) is disposed on an inner periphery (3g) of the hole (3d) of the tube portion (3a). The plate portion (11b) is provided on one end of the column portion (11a). A washer (hereinafter referred to as the "outer washer (12)") is fixed to the other end of the column portion (11a). As illustrated in FIG. 1, the lithium ion battery (10) has its seal (1) sandwiched between the outer washer (12) and the plate portion (11b) of the electrode (11). In the lithium ion battery (10), the electrolyte (L) encapsulated in the casing (not shown) of the lithium ion battery (10) is sealed by the seal (1). The seal (1) prevents moisture in the atmosphere from flowing into the casing of the lithium ion battery (10).

The seal (1) has its polymer molding (3) interposed between the electrode (11) and the metal lid (2) to prevent the electrode (11) and the metal lid (2) from coming into contact with each other (see, e.g., FIG. 1). The PFA used as the raw material of the polymer molding (3) has insulating properties. The polymer molding (3) the function of electrically insulating the metal lid (2) from the electrode (11).

Sealing Function of Sealing Structure

A front surface (2d) of the metal lid (2) is in contact with a back surface (3j) of the upper portion (3c) of the polymer molding (3). A back surface (2c) of the metal lid (2) is in contact with a front surface (3e) of the base portion (3b) of the polymer molding (3). The edge (2b) of the through hole (2a) of the metal lid (2) is in contact with the outer periphery (3h) of the tube portion (3a) of the polymer molding (3). These contact portions are referred to as the "first contact portion (S1)."

A front surface (11c) of the plate portion (11b) of the electrode (11) is in contact with a back surface (3f) of the base portion (3b) of the polymer molding (3). An outer side surface (11d) of the column portion (11a) of the electrode (11) is in contact with the inner periphery (3g) of the hole (3d) of the tube portion (3a) of the polymer molding (3). A back surface (12a) of the outer washer (12) is in contact with a front surface (3k) of the upper portion (3c) of the polymer molding (3). These contact portions are referred to as the "second contact portion (S2)."

The sealing structure (10a) provides sealing on two sealing surfaces. One of these sealing surfaces is the first contact portion (S1) described above. The other sealing surface is the second contact portion (S2) described above (see FIG. 3). In the sealing structure (10a), the seal (1) is in contact with the outer washer (12) and the plate portion (11b), and is pressed by the outer washer (12) (see FIG. 1). The sealing structure (10a) exhibits sufficient sealing properties (sufficient sealing surface pressure).

Projection

Figure 3:
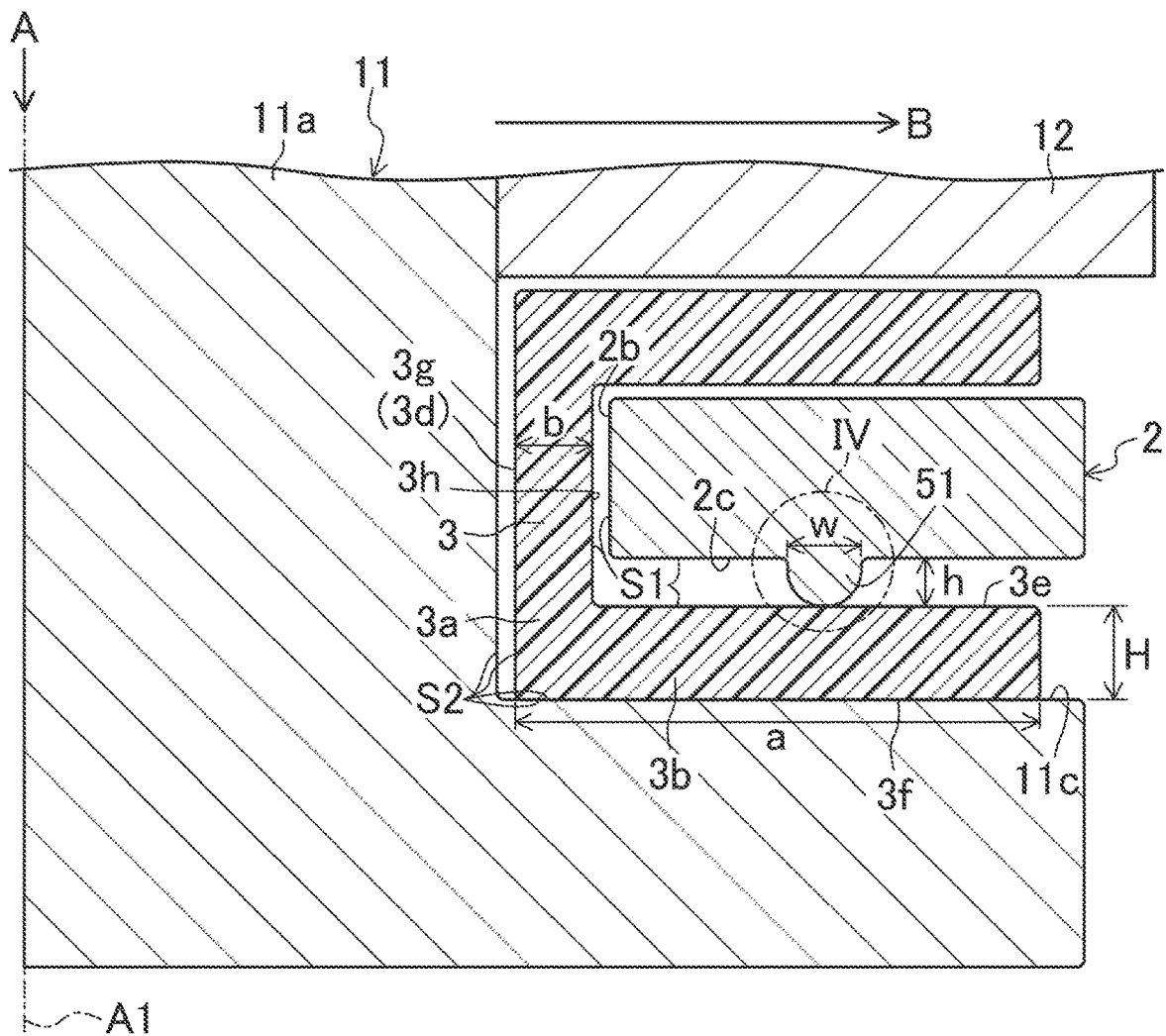
FIG. 3 illustrates a cross-sectional view of an axisymmetric model of a sealing structure used in simulation, and corresponds to an enlarged view of the sealing structure illustrated in FIG. 1.
Figure 4:
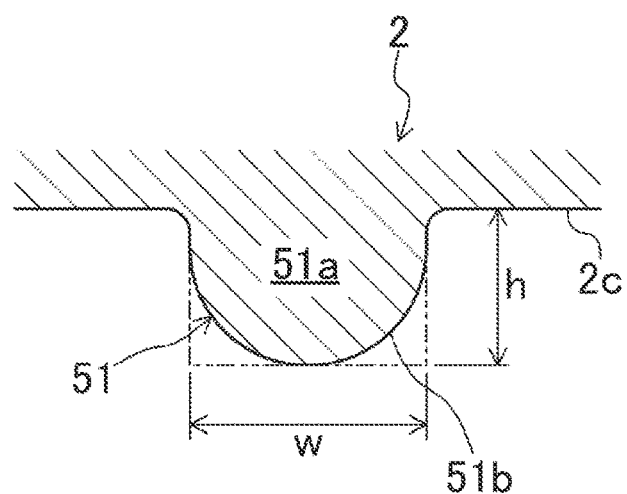
FIG. 4 illustrates an enlarged view of a portion denoted by IV illustrated in FIG. 3.

As illustrated in FIGS. 2 to 4, an annular projection (51) is formed on the back surface (2c) of the metal lid (2). The projection (51) is provided around the through hole (2a) and projects toward the base portion (3b) of the polymer molding (3).

The sealing structure (10a) according to this embodiment is distinctive in the size and shape of the projection (51).

Size of Projection

As illustrated in FIG. 3, the reference character h represents the height of the projection (51), i.e., the height of the projection (51) in the through direction (A). The reference character w represents the width of the projection (51), i.e., the length of the projection (51) in the radial direction (B). The reference character H represents the thickness of the base portion (3b) of the polymer molding (3), i.e., the height thereof in the through direction (A). The ratio h/H represents the compressibility of the polymer molding (3). The ratio h/w represents the aspect ratio of the projection (51).

The results of studying the compressibility h/H and the aspect ratio h/w through simulation will now be described.

Figure 5:
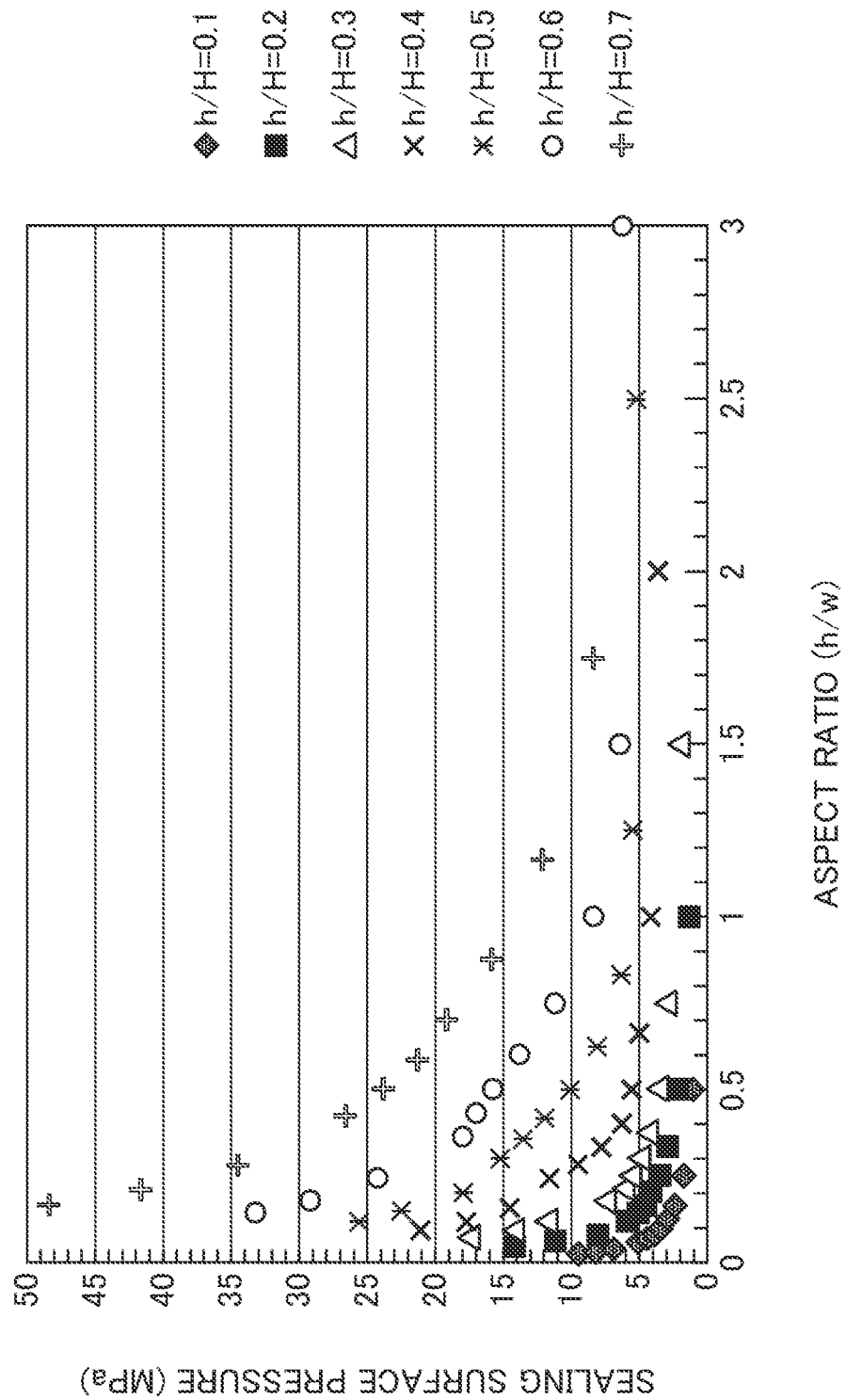
FIG. 5 illustrates the relation between the "aspect ratio (h/w)" and the "sealing surface pressure" after a lapse of 10 years for different compressibilities h/H, as determined by simulation.
Figure 6:
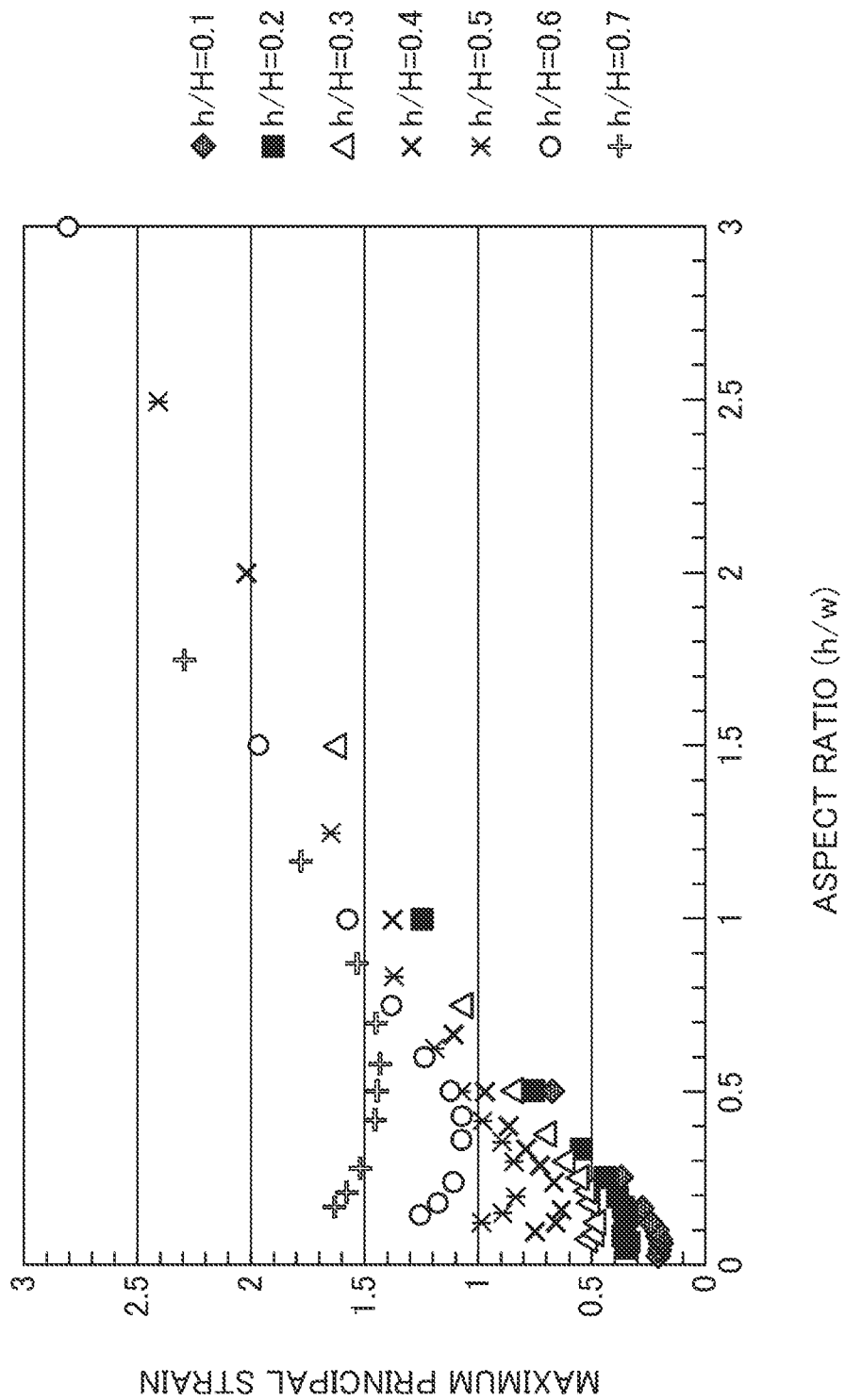
FIG. 6 illustrates the relation between the "aspect ratio (h/w)" and the "maximum principal strain" after a lapse of 10 years for different compressibilities h/H, as determined by simulation.
Figure 7:
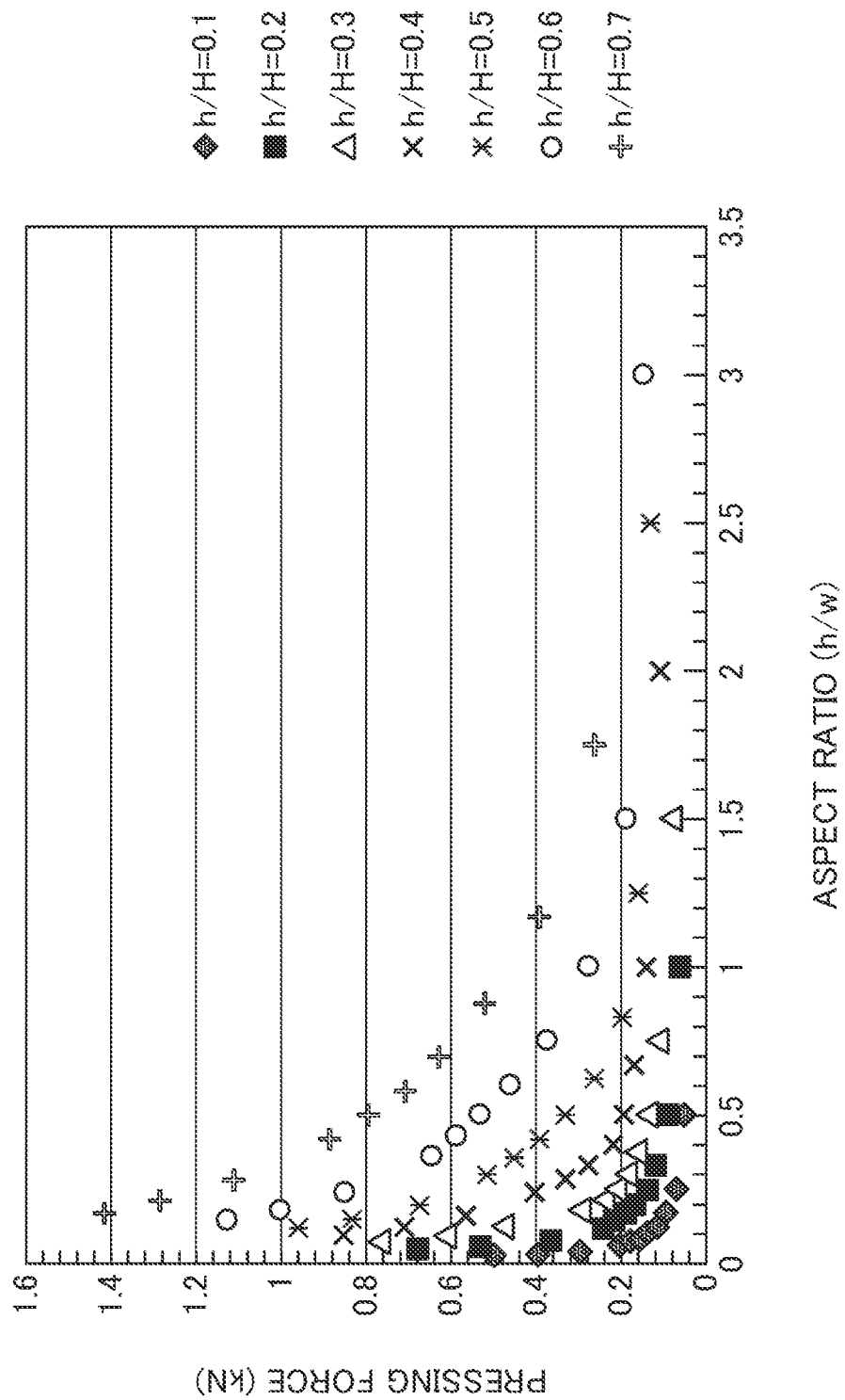
FIG. 7 illustrates the relation between the "aspect ratio (h/w)" and the "pressing force" after a lapse of 10 years for different compressibilities h/H, as determined by simulation.

Specifically, as illustrated in FIG. 3, an axisymmetric model in the shape of a rotating object about the axis (A1) was created. The relation between the aspect ratio h/w and each of the sealing surface pressure (MPa), the maximum principal strain, and the pressing force (kN), of the axisymmetric model illustrated in FIG. 3 for different compressibilities h/H was calculated. In the simulation, the outline (51b) of the cross section (51a) of the projection (51) illustrated in FIG. 4 was determined so as to have a semicircular shape or a shape close to a semicircular shape that is a smooth curve including an arc or a smooth curve including arcs and straight lines (see FIGS. 4 and 11). The cross section (51a) was determined such that the proportion of the area of the cross section (51a) to the value how, which will be described below, was about 80%. In the simulation, the electrode (11) was fixed, and the metal lid (2) was forcibly displaced downward by the distance h. In the simulation, an elastoplastic model and a modified time hardening creep model both satisfying the Mises yield criteria were used to obtain the behavior of the polymer molding (3) fastened at room temperature and then held at room temperature for 90,000 hours (about 10 years). The results are shown in FIGS. 5 to 7. Numerical values used in the simulation are as follows.

h=0.06 mm, 0.12 mm, 0.18 mm, 0.24 mm, 0.30 mm, 0.36 mm, 0.42 mm w=0.06 mm, 0.12 mm, 0.18 mm, 0.24 mm, 0.30 mm, 0.36 mm, 0.42 mm

H=0.6 mm a=3.3 mm b=0.5 mm

The "sealing surface pressure" is the lowest one of maximum sealing surface pressures created on the first contact portion (S1) and the second contact portion (S2) illustrated in FIG. 3. For example, a lower one of the maximum sealing surface pressures on the first and second contact portions (S1) and (S2) is defined as the "sealing surface pressure" used herein. The sealing surface pressure after a lapse of 90,000 hours (herein referred to also as "after a lapse of 10 years") is preferably higher than or equal to 1.1 MPa, more preferably higher than or equal to 2 MPa, and still more preferably higher than or equal to 5 MPa. A sealing surface pressure lower than 1.1 MPa cannot secure sufficient sealing properties.

FIG. 5 shows that the sealing surface pressure after a lapse of 10 years was higher than or equal to 1.1 MPa for all points within the range of compressibilities h/H of from 0.1 to 0.7. The results of FIG. 5 show that the sealing structure (10a) of this embodiment provides sufficient sealing surface pressure due to the provision of the projection (51).

It has been discovered that the sealing structure (10a) according to this embodiment provides sufficient sealing surface pressure even after a lapse of 10 years. However, consideration needs to be given to the maximum principal strain after a lapse of 10 years, as well, in terms of the durability.

The "maximum principal strain" as used herein means a maximum value of the principal strain that occurs in the polymer molding (3). In one preferred embodiment, the maximum principal strain after a lapse of 10 years is preferably 1.7 or less, more preferably 1.6 or less, and still more preferably 1.5 or less. A maximum principal strain exceeding 1.7 prevents the polymer molding (3) from having sufficient durability.

As shown in FIG. 6, the maximum principal strain after a lapse of 10 years tends to increase with an increase in the compressibility h/H. In a case of the aspect ratio h/w higher than or equal to about 0.5, the maximum principal strain after a lapse of 10 years tends to increase with an increase in the aspect ratio h/w. In a case of the aspect ratio h/w lower than about 0.5, the maximum principal strain after a lapse of 10 years has a minimum value at any one of the compressibilities h/H. In a region where the aspect ratio h/w is greater than that observed when the maximum principal strain is the minimum value, the maximum principal strain after a lapse of 10 years tends to decrease with a decrease in the aspect ratio h/w. In a region where the aspect ratio h/w is less than that observed when the maximum principal strain is the minimum value, the maximum principal strain after a lapse of 10 years tends to increase with a decrease in the aspect ratio h/w.

The projection (51) may locally deform the polymer molding (3). Thus, in one preferred embodiment, the pressing force is also taken into account. The "pressing force" is a force with which the metal lid (2) presses the polymer molding (3). The pressing force after a lapse of 10 years should not be limited, but is preferably 1 kN or less, more preferably 0.6 kN or less, and still more preferably 0.3 kN or less. If the pressing force after a lapse of 10 years exceeds 1 kN, the initial pressing force may be excessive. This may cause the metal lid (2) to be bent or deformed.

As shown in, for example, FIG. 7, in the case of the compressibility h/H lower than or equal to 0.5, the pressing force after a lapse of 10 years is 1 kN or less. For example, in the case of the compressibility h/H higher than or equal to 0.6, the pressing force after a lapse of 10 years is 1 kN or less if the aspect ratio h/w is higher than or equal to about 0.4.

The results of FIGS. 5 to 7 show that the compressibility h/H of the sealing structure (10a) according to this embodiment ranges from 0.1 to 0.7, preferably from 0.15 to 0.65, more preferably from 0.2 to 0.6, still more preferably from 0.2 to 0.55, and yet more preferably from 0.25 to 0.5. A compressibility h/H lower than 0.1 may make it difficult for the sealing structure (10a) to have sufficient sealing properties. A compressibility h/H exceeding 0.7 may make it difficult for the sealing structure (10a) to have sufficient durability.

To reduce the influence of tolerance and errors in an assembly process, a higher value of the lower limit of the compressibility h/H is preferable.

To reduce the maximum principal strain after a lapse of 10 years, a lower upper limit of the compressibility h/H is preferable. In particular, comparisons among maximum principal strains for the different compressibilities h/H under aspect ratios h/w close to about 0.3 in FIG. 6 show that an increment of the maximum principal strains for compressibilities h/H from 0.6 to 0.7 is greater than an increment of the maximum principal strains for compressibilities h/H from 0.1 to 0.5. In one preferred embodiment, considering the tolerance and errors in the assembly process, the compressibility h/H is lower than or equal to 0.5 to secure the stability of the whole design.

The results of FIGS. 5 to 7 show that the aspect ratio h/w of the projection (51) of the sealing structure (10a) according to this embodiment ranges from 0.1 to 1.0, preferably from 0.1 to 0.9, more preferably from 0.2 to 0.8, still more preferably from 0.25 to 0.75, yet more preferably from 0.3 to 0.7, further preferably from 0.35 to 0.65, and still further preferably from 0.4 to 0.6. In the case of the aspect ratio h/w lower than 0.1, changes after a lapse of 10 years in the maximum principal strain produced in the polymer molding (3) associated with changes in the compressibility are too great, resulting in unstable design of the sealing structure (10a). In the case of the aspect ratio h/w exceeding 1.0, the maximum principal strain may be too large after a lapse of 10 years. This may prevent the polymer molding (3) from having sufficient durability. As shown in FIG. 5, the sealing surface pressure after a lapse of 10 years tends to be higher with a decrease in the aspect ratio h/w. Thus, in one preferred embodiment, the aspect ratio h/w is lower than or equal to 1.0. To allow the sealing structure to have sufficient sealing properties and sufficient durability for a long time, a lower upper limit of the aspect ratio h/w is preferable. To lower the maximum principal strain after a lapse of 10 years, a higher value of the lower limit of the aspect ratio h/w is preferable. A higher value of the lower limit of the aspect ratio h/w is preferable in order to lower the ratio of the change in the maximum principal strain to the change in the compressibility h/H and thereby reduce the influence of tolerance and errors in the assembly process and secure the stability of the whole design.

Shape of Projection

Figure 8:
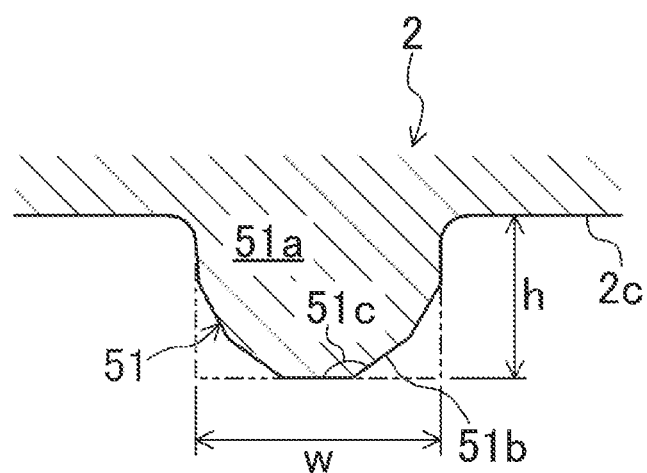
FIG. 8 illustrates a variation of a projection illustrated in FIG. 4.
Figure 11:
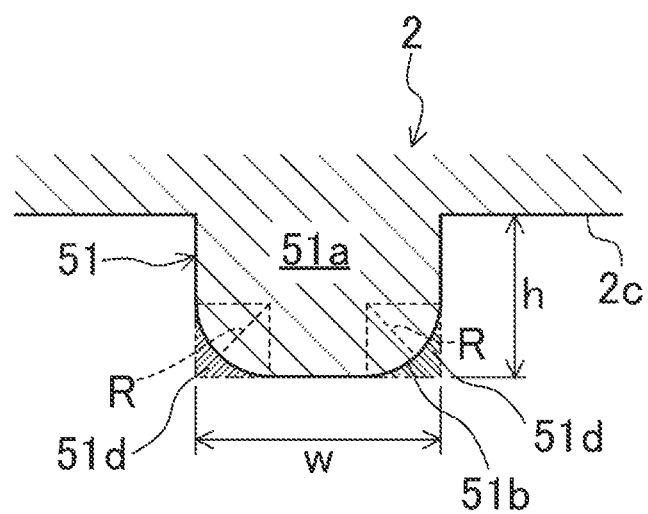
FIG. 11 illustrates a variation of the projection illustrated in FIG. 4.

FIGS. 4, 8, and 11 illustrate examples of the shape of the projection (51).

Outline

The outline (51b) of the projection (51) will now be described with reference to FIGS. 4 and 8 to 11.

As viewed in the cross section (51a) of the projection (51), the outline (51b) of the projection (51) forms at least either a smooth curve or a plurality of straight lines.

The "smooth curve" as used herein means, for example, an arc (see FIG. 4), a waveform, arcs connected together by straight lines (see FIG. 11), or any other suitable shape. A situation where the outline (51b) forms a plurality of straight lines means a situation where the entirety or a portion of the outline (51b) forms part of a polygon (see FIG. 8) or any other similar situation.

An interior angle (51c) formed between two adjacent ones of the plurality of straight lines forming the outline (51b) will now be described with reference to FIGS. 8 to 10. The "interior angle (51c)" as used herein means an angle greater than or equal to 0° and less than 360°.

The circular shape (see FIG. 4) was represented by a regular polygon (see FIG. 8) as the outline (51b) of the projection (51). The relation between the interior angle (51c) and each of the sealing surface pressure and the maximum principal strain after a lapse of 10 years was obtained by simulation. The determination results are shown in FIGS. 9 and 10.

The conditions of the simulation are the same as those of the simulation of FIGS. 5 to 7 described above except that the height h was equal to 0.3 mm, the width w was equal to 0.6 mm, and the thickness H was equal to 0.6 mm (the compressibility h/H=0.5, the aspect ratio h/w=0.5).

Figure 9:
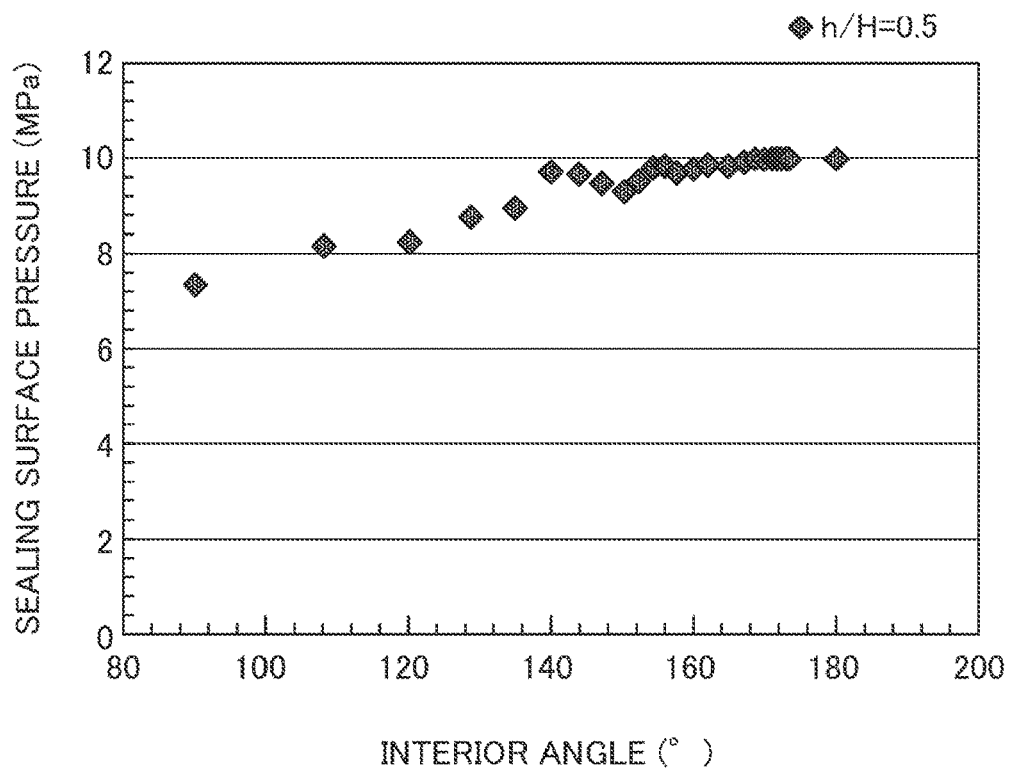
FIG. 9 illustrates the relation between the "interior angle (51c)" of a regular polygon representing an outline (51b) of a cross section (51a) of a projection (51) with a height h of 0.3 mm and a width w of 0.6 mm and the "sealing surface pressure," as determined by simulation.

FIG. 9 shows that if the interior angle (51c) is greater than or equal to about 150°, the sealing surface pressure after a lapse of 10 years is stable. FIG. 10 shows that an interior angle (51c) greater than or equal to about 160° stabilizes the maximum principal strain after a lapse of 10 years. The simulation results show that the interior angle (51c) is preferably greater than or equal to 160° to secure the stability of both of the sealing surface pressure and the maximum principal strain after a lapse of 10 years.

Figure 10:
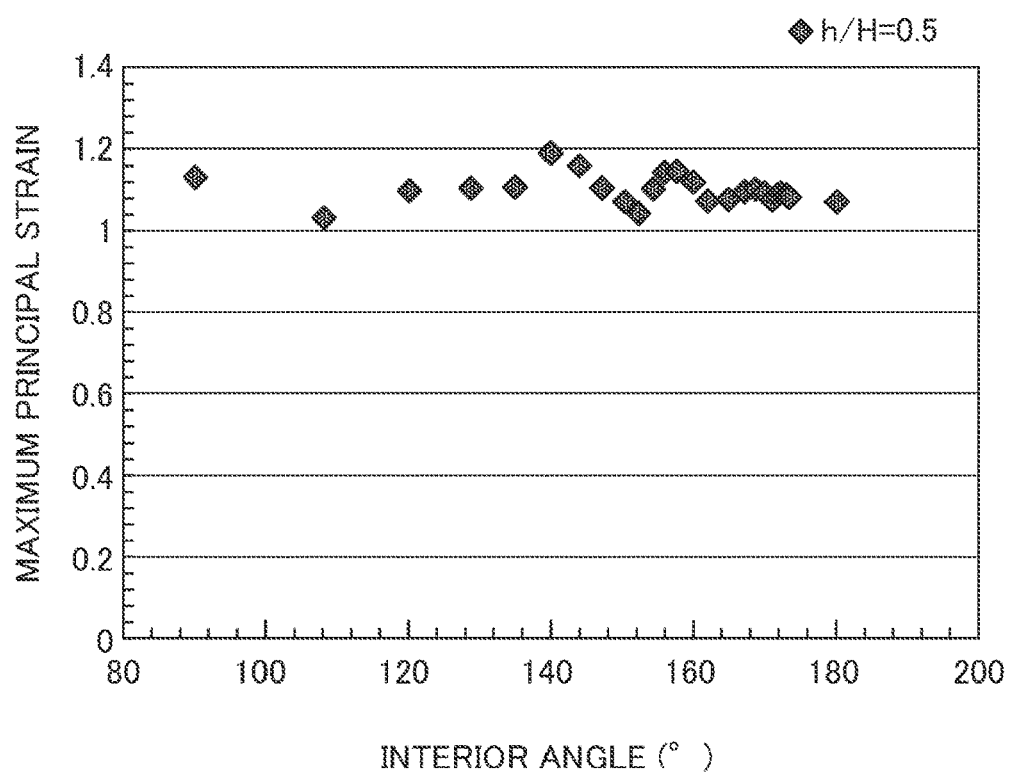
FIG. 10 illustrates the relation between the "interior angle (51c)" of the regular polygon representing the outline (51b) of the cross section (51a) of the projection (51) with a height h of 0.3 mm and a width w of 0.6 mm and the "maximum principal strain," as determined by simulation.

The results of FIGS. 9 and 10 show that in the sealing structure (10a) according to this embodiment, the interior angle (51c) between two adjacent ones of the plurality of straight lines is greater than or equal to 160° and less than 360°. An interior angle (51c) less than 160° makes it difficult to secure the stability of the maximum principal strain after a lapse of 10 years.

The outline (51b) may be a combination of a smooth curve and a plurality of straight lines with an interior angle (51c) greater than or equal to 160° and less than 360°.

Cross-Sectional Area

The area of the cross section (51a) of the projection (51) (herein referred to also as the "cross-sectional area of the projection (51)") will now be described with reference to FIGS. 11 to 13.

Consideration is given to an example in which as illustrated in FIG. 11, the outline (51b) of the projection (51) is formed of straight lines and arcs with a radius R. The arcs with the radius R are arranged at two lower corners of the projection (51) as viewed in the cross section (51a).

A change in the radius R causes a change in the area of regions (51d) to be cut away, and hence a change in the area of the cross section (51a). The ratio (percentage) of the area of the regions (51d) to be cut away to the value how is expressed by $[2(R^2-R^2\pi/4)/h\cdot w]\times 100$. The ratio (percentage) of the area of the cross section (51a) to the value how is expressed by $[1-2(R^2-R^2\pi/4)/h\cdot w]\times 100$.

The relation between the amount of time elapsed and each of the sealing surface pressure and the maximum principal strain for different radii R of from 0.05 to 0.20 was obtained by simulation. The results are shown in FIGS. 12 and 13. The amount of time elapsed at the right end of each of FIGS. 12 and 13 corresponds to 10 years.

The conditions of the simulation are the same as those of the simulation of FIGS. 5 to 7 described above except that the height h was equal to 0.3 mm, the width w was equal to 0.4 mm, and the thickness H was equal to 0.6 mm (the compressibility h/H=0.5, the aspect ratio h/w=0.75).

Figure 12:
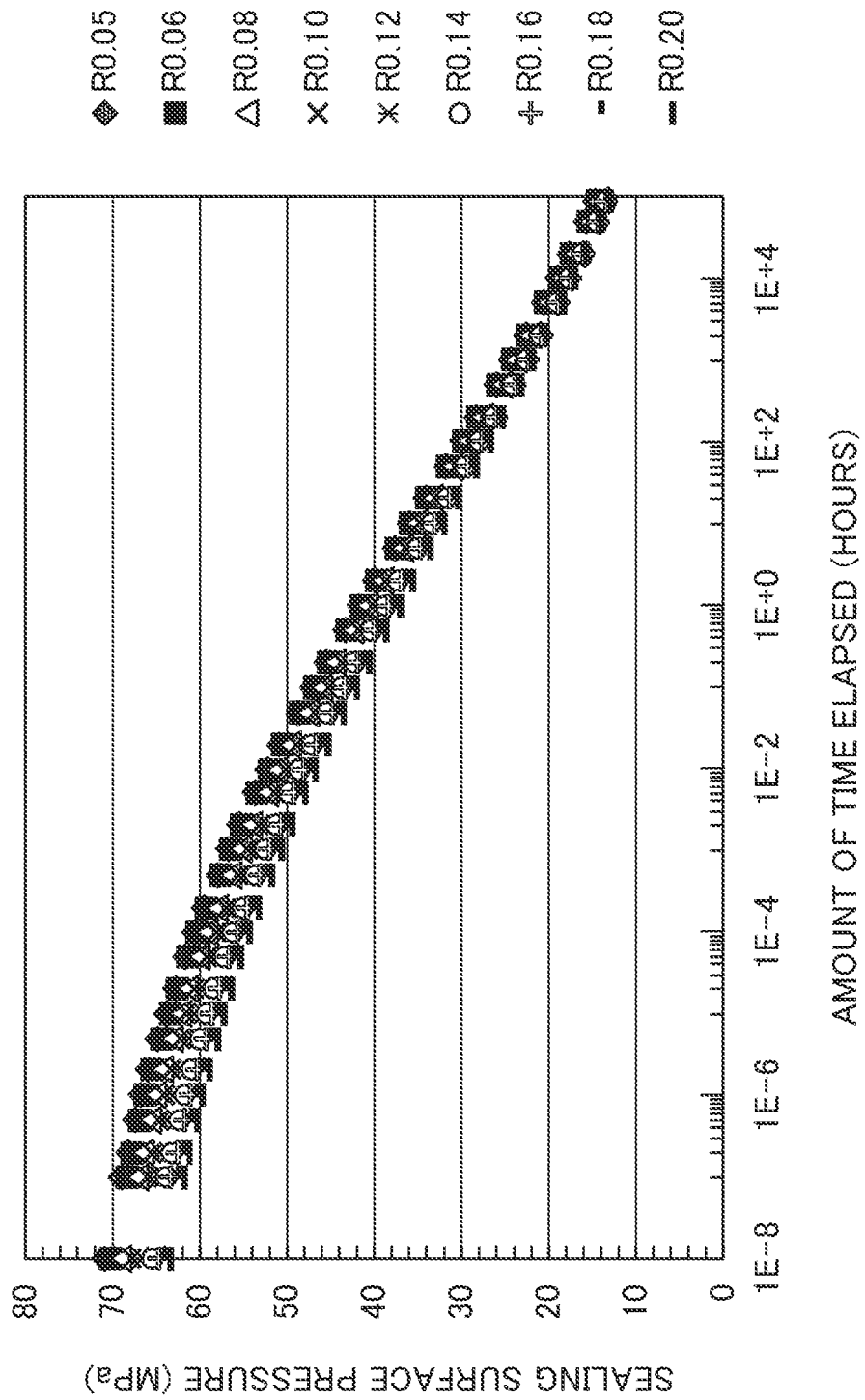
FIG. 12 illustrates the relation between the "amount of time elapsed" and the "sealing surface pressure" for different radii R of a projection with a height h of 0.3 mm and a width w of 0.4 mm, as determined by simulation.

As shown in FIG. 12, the sealing surface pressure tends to decrease as a whole with time, and variations in the sealing surface pressure due to different radii R are smaller with time. The sealing surface pressure after a lapse of 10 years is higher than or equal to 10 MPa irrespective of the value of the radius R. Thus, the variations in the area of the cross section (51a) have little effect on the sealing surface pressure after a lapse of 10 years.

Figure 13:
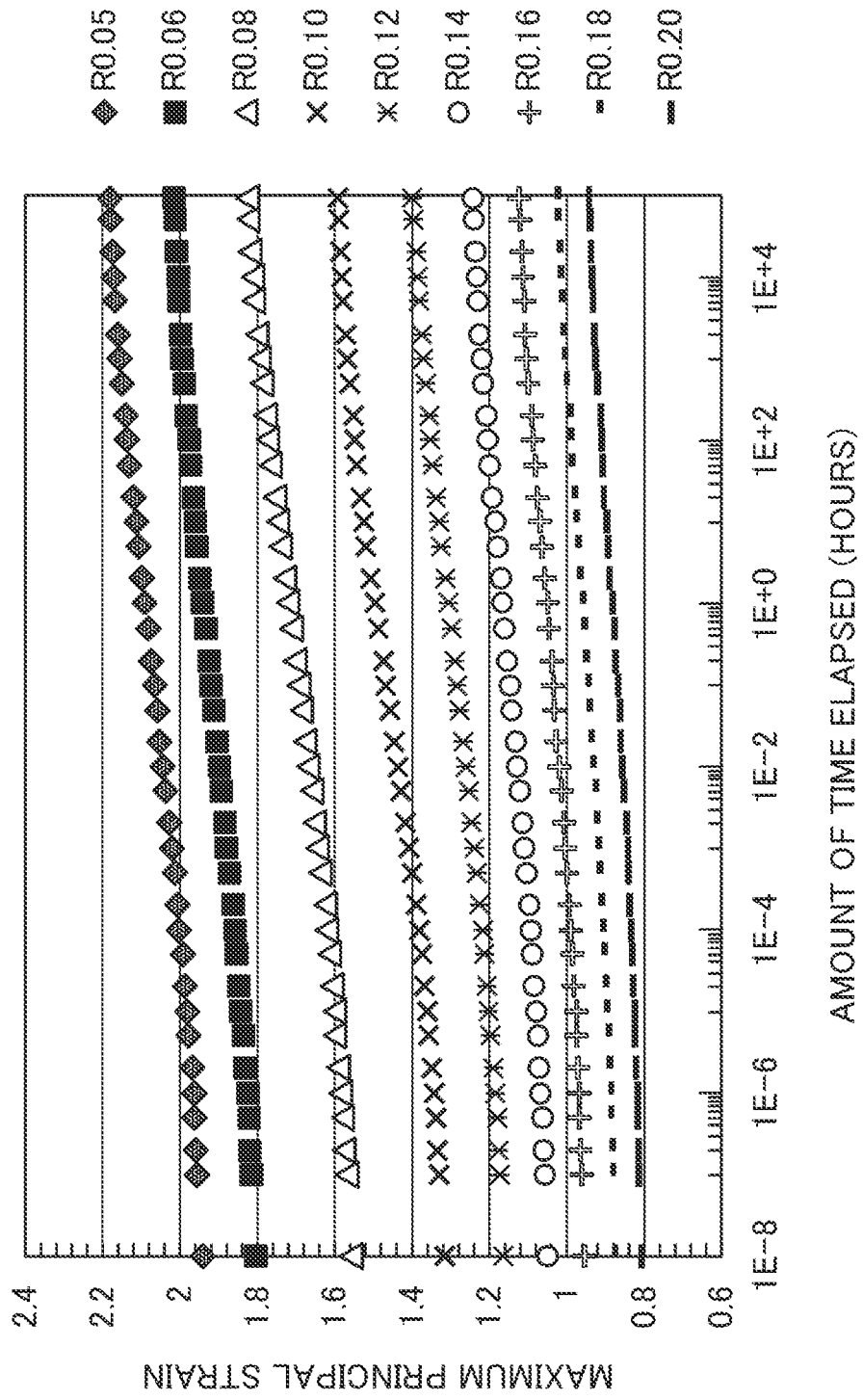
FIG. 13 illustrates the relation between the "amount of time elapsed" and the "maximum principal strain" for different radii R of the projection with a height h of 0.3 mm and a width w of 0.4 mm, as determined by simulation.

As shown in FIG. 13, the maximum principal strain varies greatly among different radii R. The maximum principal strain tends to increase as a whole with time. In the case of R≥0.10, the maximum principal strain is less than or equal to 1.7 even after a lapse of 10 years. The ratio (percentage) of the area of the cross section (51a) satisfying the condition of R≥0.10 to the value how is less than or equal to 96%. It is estimated, based on FIG. 13, that if the radius R is greater than or equal to 0.11, the maximum principal strain after a lapse of 10 years will be less than or equal to 1.5. The ratio (percentage) of the area of the cross section (51a) satisfying the condition R≥0.11 to the value h w is less than or equal to 95%.

The cross-sectional area of the projection (51) ranges from 50% to 96%, preferably from 50% to 95%, of the value how expressed by the product of the height h and the width w. If the ratio of the area of the cross section (51a) to the value how is less than 50%, the area of the cross section (51a) may be excessively small, and the distal end of the projection (51) may be excessively narrow. FIG. 13 shows that if the ratio of the area of the cross section (51a) of the projection (51) to the value hw exceeds 96%, the maximum principal strain after a lapse of 10 years exceeds 1.7. This may prevent the polymer molding (3) from having sufficient durability.

Advantages of First Embodiment

The sealing structure (10a) of the lithium ion battery (10) of this embodiment includes the plate-shaped metal lid (2) having the through hole (2a). The sealing structure (10a) includes the polymer molding (3) having the tube portion (3a) and the base portion (3b). The tube portion (3a) is provided along the entire edge (2b) of the through hole (2a). The base portion (3b) is provided on the tube portion (3a). The sealing structure (10a) includes the electrode (11) having the column portion (11a) and the plate portion (11b). The column portion (11a) is disposed on the inner periphery (3g) of the tube portion (3a). The plate portion (11b) is provided on the column portion (11a). The back surface (2c) of the metal lid (2) is in contact with the front surface (3e) of the base portion (3b) of the polymer molding (3). The front surface (11c) of the plate portion (11b) of the electrode (11) is in contact with the back surface (3f) of the base portion (3b) of the polymer molding (3). At least one of the back surface (2c) of the metal lid (2) or the front surface (11c) of the plate portion (11b) of the electrode (11) has the annular projection (51) provided around the through hole (2a) and projecting toward the base portion (3b) of the polymer molding (3). The ratio h/H ranges from 0.1 to 0.7, and the ratio h/w ranges from 0.1 to 1.0, where h represents the height of the projection (51), w represents the width of the projection (51), and H represents the thickness of the base portion (3b) of the polymer molding (3). As viewed in the cross section (51a) of the projection (51), the outline (51b) of the projection (51) forms at least either a smooth curve or a plurality of straight lines forming an interior angle (51c) greater than or equal to 160° and less than 360°. The area of the cross section (51a) of the projection (51) ranges from 50% to 96% of the value hw expressed by the product of the values h and w.

The foregoing configuration allows the sealing structure (10a) to have sealing properties and durability enough to withstand long-term use, such as 10-year use.

In one preferred embodiment, the ratio h/H of the sealing structure (10a) of this embodiment ranges from 0.15 to 0.65, and the ratio h/w thereof ranges from 0.1 to 0.9.

In one preferred embodiment, the ratio h/H of the sealing structure (10a) of this embodiment ranges from 0.2 to 0.6, and the ratio h/w thereof ranges from 0.2 to 0.8.

In one preferred embodiment, the ratio h/H of the sealing structure (10a) of this embodiment ranges from 0.2 to 0.55, and the ratio h/w thereof ranges from 0.25 to 0.75.

In one preferred embodiment, the ratio h/H of the sealing structure (10a) of this embodiment ranges from 0.25 to 0.5, and the ratio h/w thereof ranges from 0.3 to 0.7.

In one preferred embodiment, the ratio h/H of the sealing structure (10a) of this embodiment ranges from 0.3 to 0.5, and the ratio h/w thereof ranges from 0.35 to 0.65.

In one preferred embodiment, the ratio h/H of the sealing structure (10a) of this embodiment ranges from 0.3 to 0.5, and the ratio h/w thereof ranges from 0.4 to 0.6.

A higher value of the lower limit of the compressibility h/H can more effectively reduce the influence of tolerance and errors in the assembly process. A lower value of the upper limit of the compressibility h/H can more effectively reduce the maximum principal strain after a lapse of 10 years. In particular, a compressibility h/H lower than or equal to 0.5 can reduce the influence of tolerance and errors in the assembly process, and effectively secure the stability of the whole design.

A lower value of the upper limit of the aspect ratio h/w can more effectively provide sufficient sealing properties and sufficient durability for a long period of time. A higher value of the lower limit of the aspect ratio h/w can more effectively lower values of the maximum principal strain after a lapse of 10 years. A higher value of the lower limit of the aspect ratio h/w can more effectively lower the ratio of the change in the maximum principal strain to the change in the compressibility h/H, and can reduce the influence of tolerance and errors in the assembly process and thus effectively secure the stability of the whole design.

Second Embodiment

A sealing structure (10a) of a lithium ion battery (10) according to a second embodiment will now be described with reference to FIGS. 14 to 21.

Figure 14:
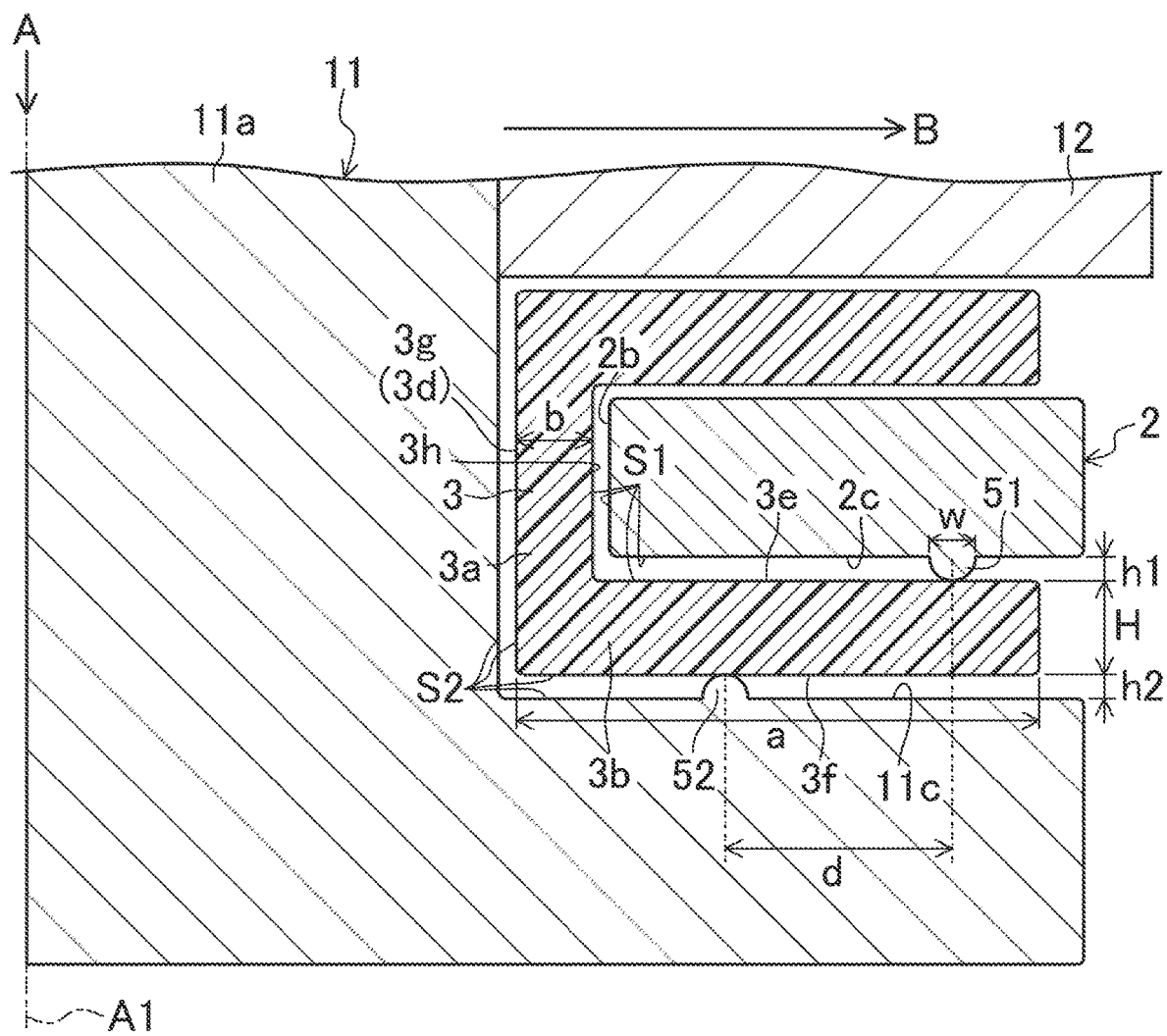
FIG. 14 illustrates a sealing structure according to a second embodiment, and corresponds to FIG. 3.

As illustrated in FIG. 14, the sealing structure (10a) according to the second embodiment is different from the sealing structure (10a) according to the first embodiment in that the sealing structure (10a) according to the second embodiment includes two projections (51). Specifically, the sealing structure (10a) of the second embodiment includes first and second projections (51) and (52) each serving as the projection (51).

First and Second Projections

As illustrated in FIG. 14, the sealing structure (10a) according to this embodiment includes the first projection (51) formed on the back surface (2c) of the metal lid (2). The first projection (51) has the same configuration as the projection (51) of the first embodiment illustrated in FIG. 3. The sealing structure (10a) according to this embodiment includes the second projection (52) formed on the front surface (11c) of the plate portion (11b) of the electrode (11). The second projection (52) is provided around the through hole (2a) and forms an annular shape, and projects toward the base portion (3b) of the polymer molding (3).

Positional Relation Between First and Second Projections

The second projection (52) is provided inside the first projection (51) in the radial direction (B). The characters h1 and h2 respectively represent the heights h of the first and second projections (51) and (52). The character d represents the distance between the first and second projections (51) and (52). The distance d between the first and second projections (51) and (52) refers to the distance between the vertexes of the first and second projections (51) and (52). The vertexes of the first and second projections (51) and (52) are reference points of the heights h1 and h2, respectively. The character H represents the thickness of the base portion (3b) of the polymer molding (3).

The sealing structure (10a) according to this embodiment is characterized in that the values α and β expressed by the following formula (1) satisfy a predetermined relation.

$$\alpha = (h1+h2)/H, \beta = d/H \tag{1}$$

where α represents the "compressibility" of the polymer molding (3) compressed by the first and second projections (51) and (52). The compressibility α can be theoretically higher than zero and lower than or equal to two. Meanwhile, in one preferred embodiment, the compressibility α ranges from 0.1 to 1.4. In a case of a compressibility α lower than 0.1, it may be extremely difficult to form a projection. In a case of a compressibility α exceeding 1.4, the shape of the polymer molding (3) may change too much, and the maximum principal strain may be too large.

The value β is obtained by dividing the distance d between the first and second projections (51) and (52) by the thickness H of the polymer molding (3). The value β is for estimating the influence of the distance d on the polymer molding (3) in connection with the thickness H of the polymer molding (3). The value β as used herein is referred to as the "d-related value" for convenience.

The results of studying the relation between the compressibility α and the d-related value β through simulation will now be described.

Specifically, an axisymmetric model illustrated in FIG. 14 was created. The axisymmetric model illustrated in FIG. 14 has the shape of a rotating object about the axis (A1). The outline (51b) of the cross section (51a) of the first projection (51) was determined so as to have a semicircular shape or a shape close to a semicircular shape that is a smooth curve including an arc or a smooth curve including arcs and straight lines. The cross section (51a) of the first projection (51) was determined such that the proportion of the area of the cross section (51a) to the value how was about 80%. The shape and size of a cross section of the second projection (52) were the same as those of the first projection (51).

The relations between the value β and each of the sealing surface pressure (MPa), the maximum principal strain, and the pressing force (kN), of the axisymmetric model illustrated in FIG. 14 after a lapse of 10 years for a fixed compressibility α and for different compressibilities α were calculated. In the simulation, the electrode (11) was fixed, and the metal lid (2) was forcibly displaced downward by a distance 2h1 (=h1+h2, where h1=h2). In the simulation, an elastoplastic model and a modified time hardening creep model both satisfying the Mises yield criteria were used to obtain the behavior of the polymer molding (3) fastened at room temperature and then held at room temperature for 10 years. The results are shown in FIGS. 15 to 20. Numerical values used in the simulation are shown in Table 1 and as follows.

TABLE 1

| Experimental Examples | h1 = h2 (mm) | w (mm) | Compressibility α |
|---|---|---|---|
| 1 | 0.06 | 0.12 | 0.2 |
| 2 | 0.12 | 0.24 | 0.4 |
| 3 | 0.18 | 0.36 | 0.6 |
| 4 | 0.24 | 0.48 | 0.8 |
| 5 | 0.3 | 0.6 | 1 | d=0 mm to 2.0 mm, every 0.1 mm
H=0.6 mm
a=3.3 mm
b=0.5 mm

The following three types (A) to (C) of variation in the value β were studied.

(A) In FIG. 14, the position of the second projection (52) is fixed, and the position of the first projection (51) is shifted from the outside toward the inside, thereby reducing the value d to reduce the value β. (B) In FIG. 14, the position of the first projection (51) is fixed, and the position of the second projection (52) is shifted from the inside toward the outside, thereby reducing the value d to reduce the value β. (C) In FIG. 14, the position of the first projection (51) is shifted from the outside toward the inside, and the position of the second projection (52) is shifted from the inside toward the outside, thereby reducing the value d to reduce the value β.

Figure 15:
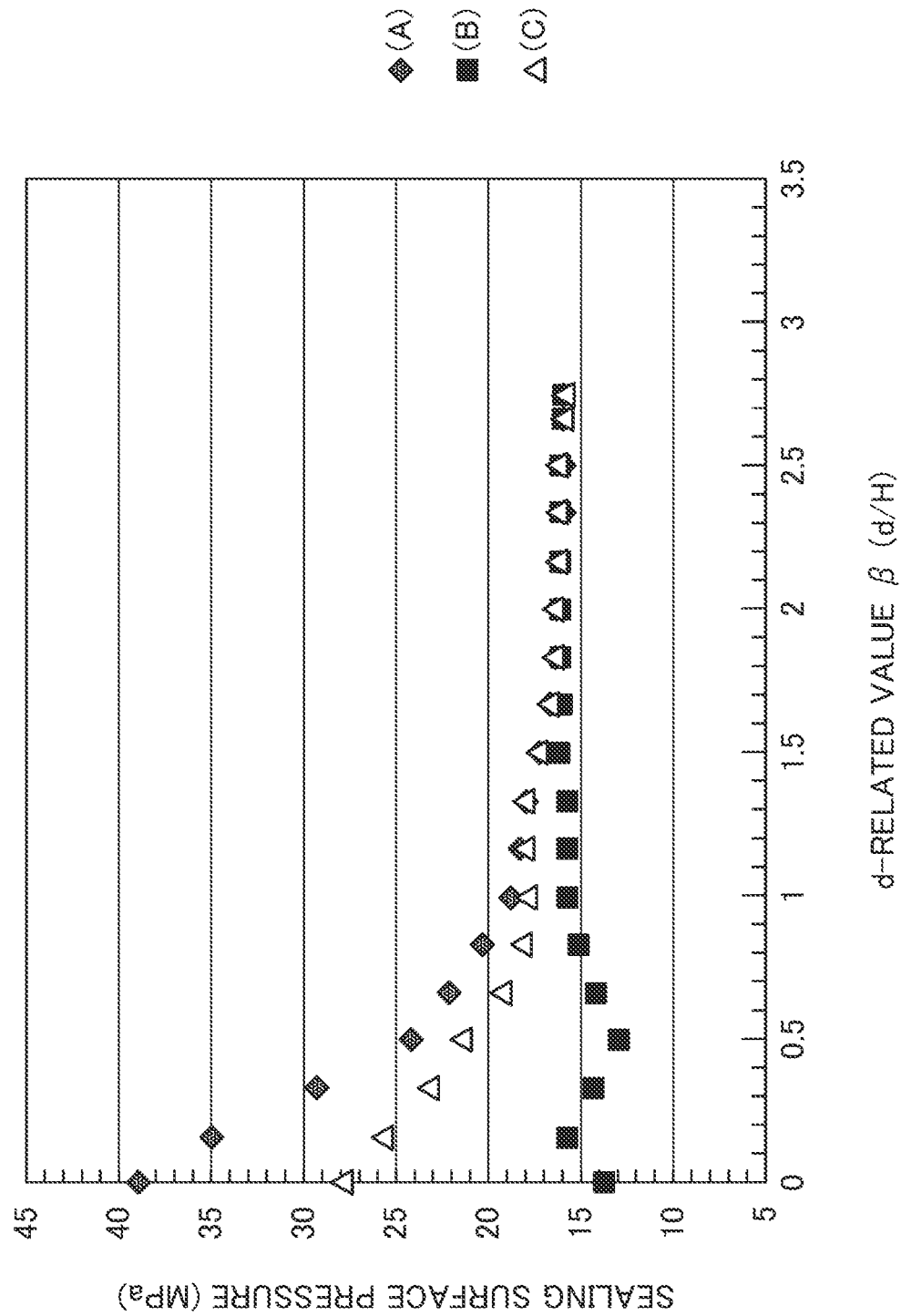
FIG. 15 illustrates the relation between the "d-related value $\beta$ (d/H)" and the "sealing surface pressure" after a lapse of 10 years, as determined by simulation of a first experimental example.
Figure 16:
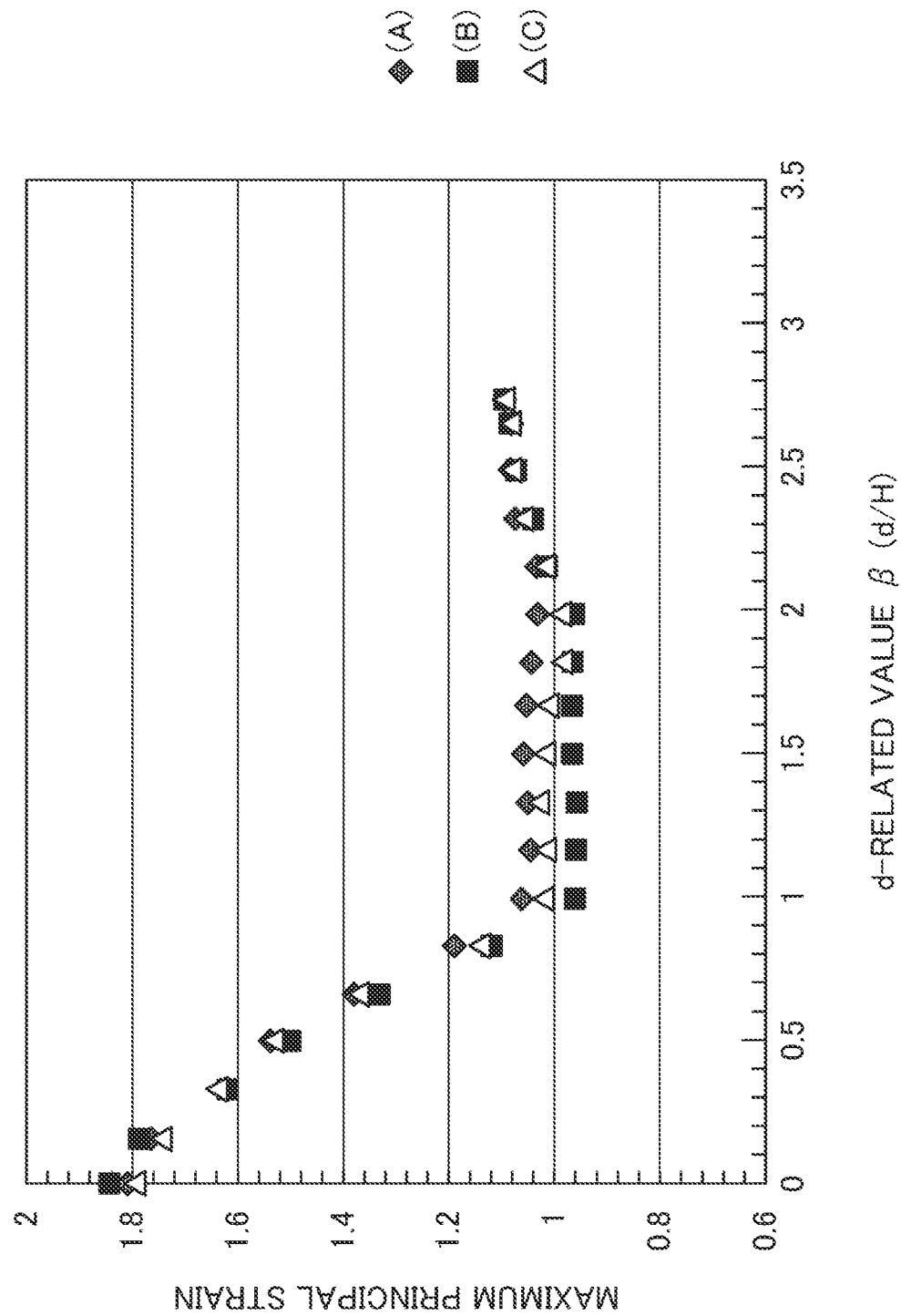
FIG. 16 illustrates the relation between the "d-related value $\beta$ (d/H)" and the "maximum principal strain" after a lapse of 10 years, as determined by the simulation of the first experimental example.
Figure 17:
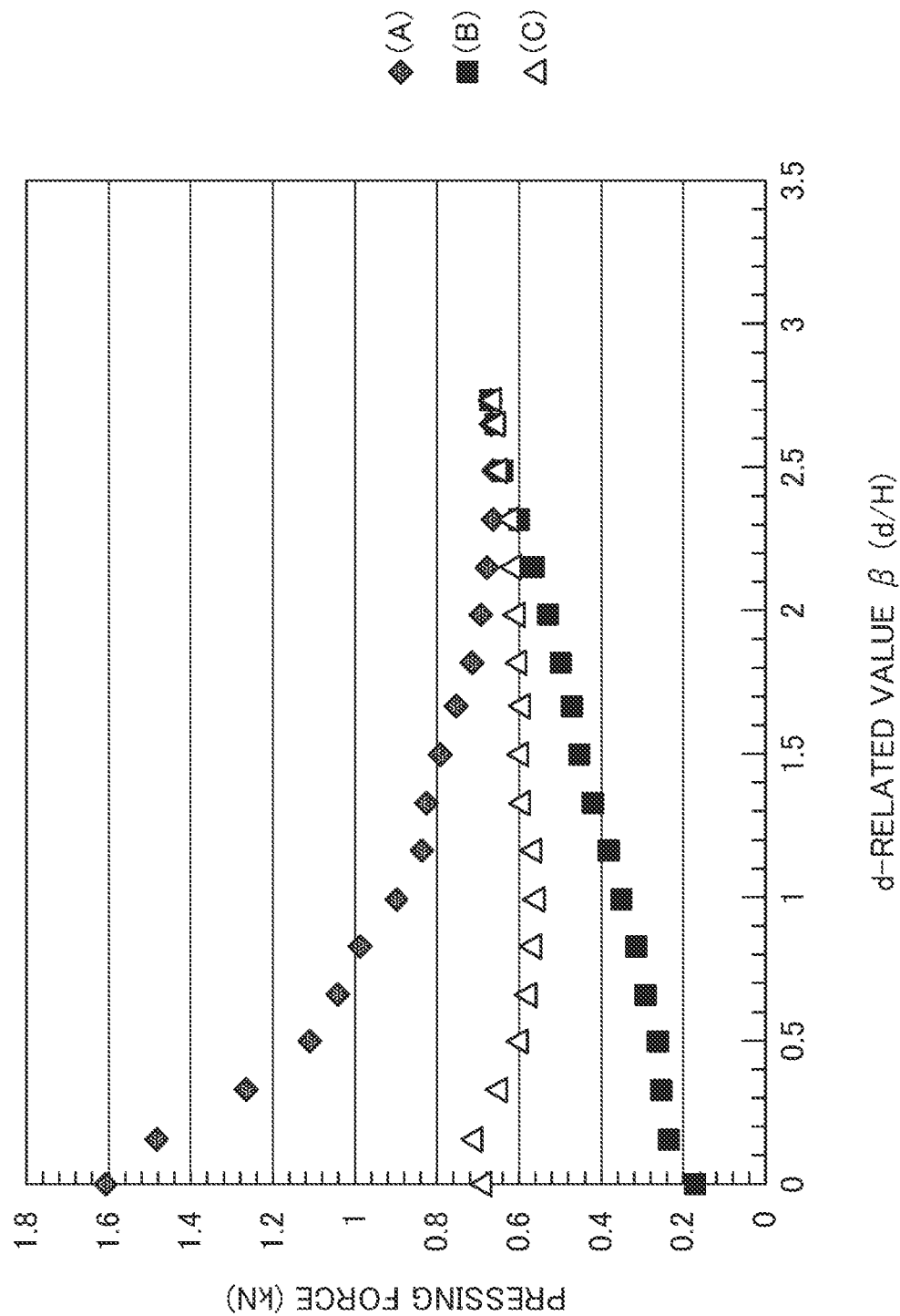
FIG. 17 illustrates the relation between the "d-related value $\beta$ (d/H)" and the "pressing force" after a lapse of 10 years, as determined by the simulation of the first experimental example.

FIGS. 15 to 17 exemplify simulation results of a first experimental example shown in Table 1.

FIGS. 15 and 17 show that each of the sealing surface pressure and the pressing force after a lapse of 10 years under the type (C) is about an intermediate value between the associated value under the type (A) and the associated value under the type (B). FIG. 16 shows that the maximum principal strain after a lapse of 10 years exhibits the same behavior irrespective of the differences among the types (A) to (C). Although not intended to limit the present disclosure, it seems desirable to employ the type (C) in studying the influence of the value β on the sealing surface pressure, the maximum principal strain, and the pressing force after a lapse of 10 years.

Figure 18:
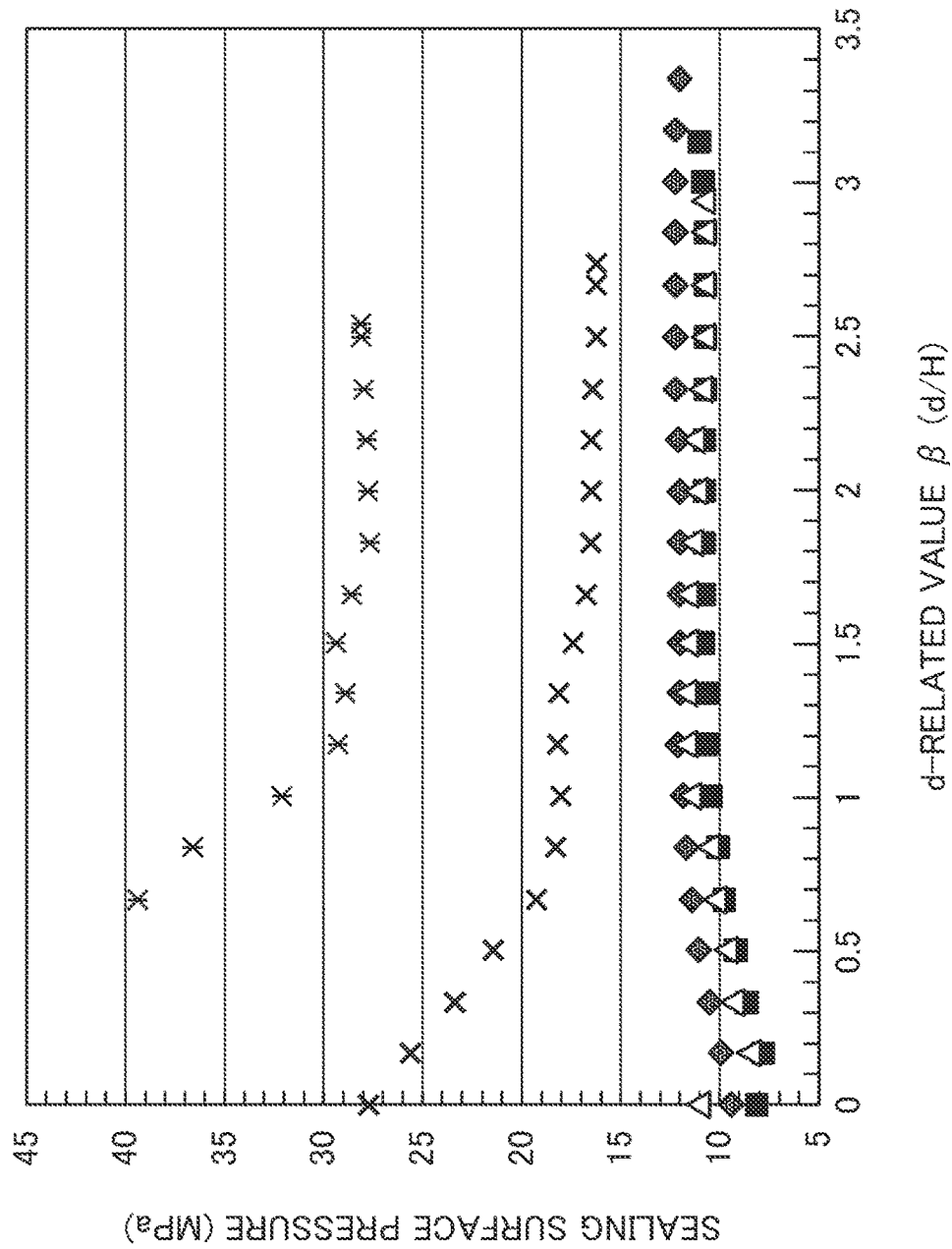
FIG. 18 illustrates the relation between the "d-related value $\beta$ (d/H)" and the "sealing surface pressure" after a lapse of 10 years for different compressibilities, as determined by simulation.
Figure 19:
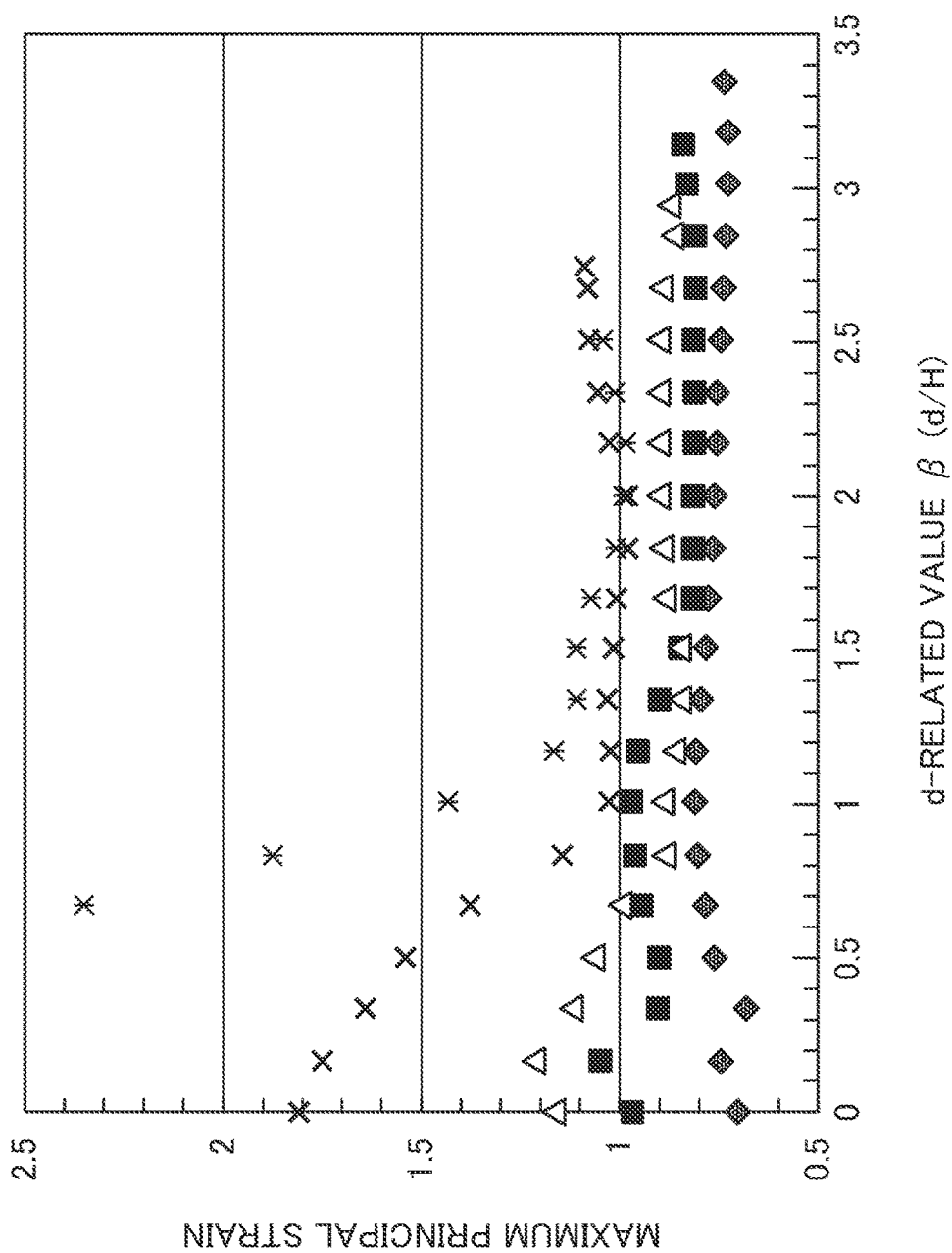
FIG. 19 illustrates the relation between the "d-related value $\beta$ (d/H)" and the "maximum principal strain" after a lapse of 10 years for different compressibilities, as determined by simulation.
Figure 20:
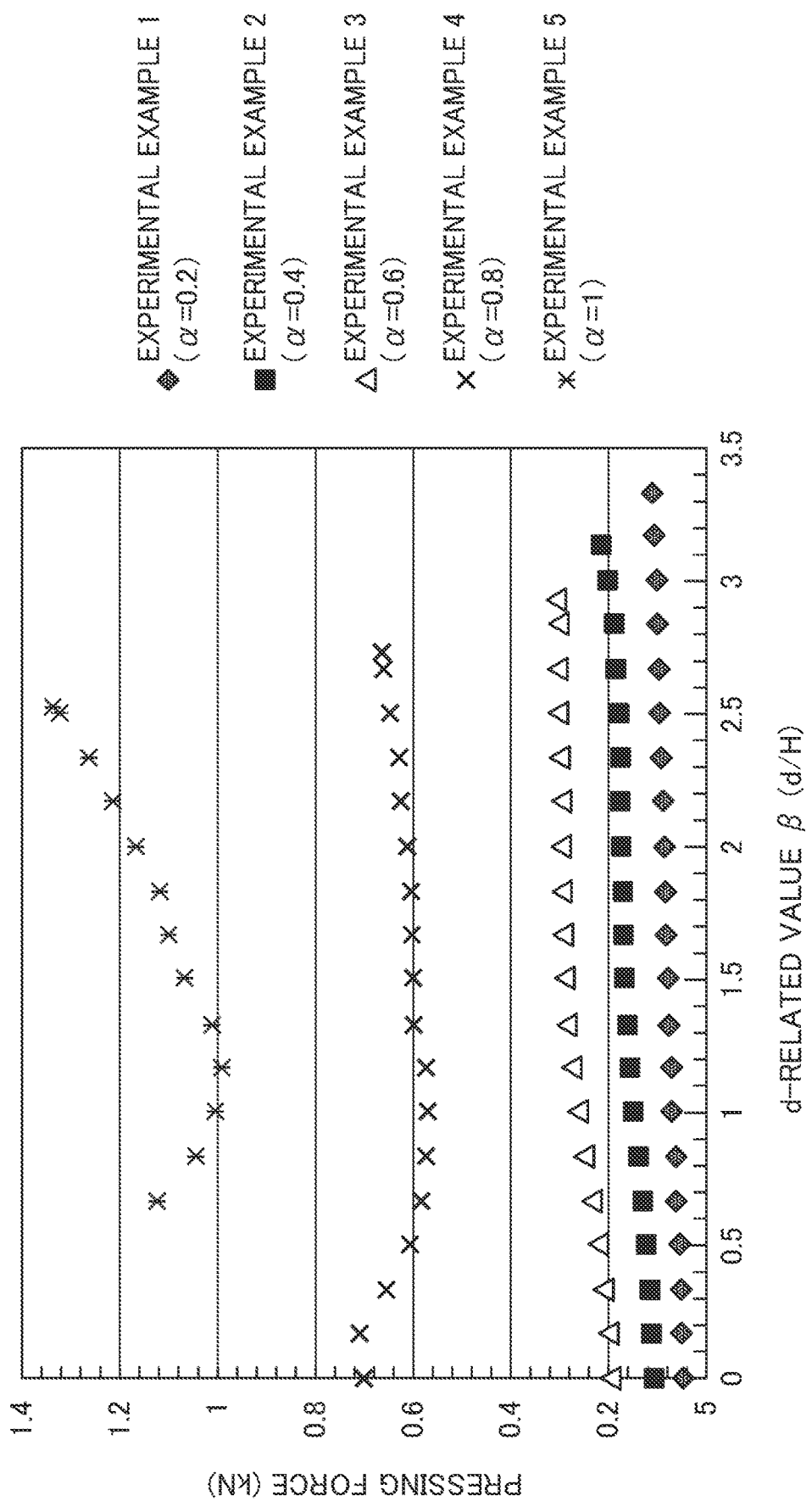
FIG. 20 illustrates the relation between the "d-related value $\beta$ (d/H)" and the "pressing force" after a lapse of 10 years for different compressibilities, as determined by simulation.

FIGS. 18 to 20 show a summary of the simulation results of first to fifth experimental examples under the type (C) described above.

FIG. 18 shows that in any of the experimental examples, the sealing structure has a sealing surface pressure higher than or equal to 5 MPa after a lapse of 10 years, and thus has sufficient sealing properties. Comparisons among the experimental examples show that the sealing surface pressures of the first to third experimental examples were substantially equal to one another irrespective of the compressibility α. In the fourth and fifth experimental examples, the sealing surface pressure increases with an increase in the compressibility α. In any of the first to fifth experimental examples, the sealing surface pressure after a lapse of 10 years is stabilized as the value β increases.

As shown in FIG. 19, in the fifth experimental example in which the compressibility α is 1, it is conceivable that the maximum principal strain after a lapse of 10 years exceeds 1.7 in a case of the d-related value β less than or equal to 0.9. In the fourth experimental example in which the compressibility α is 0.8, it is conceivable that the maximum principal strain exceeds 1.7 in a case of the d-related value β less than or equal to 0.25. If consideration is given to the numerical value of the maximum principal strain, it is conceivable that there are a certain range of the compressibility α and a certain range of the d-related value β that satisfy the condition where the maximum principal strain is less than or equal to 1.7.

Figure 21:
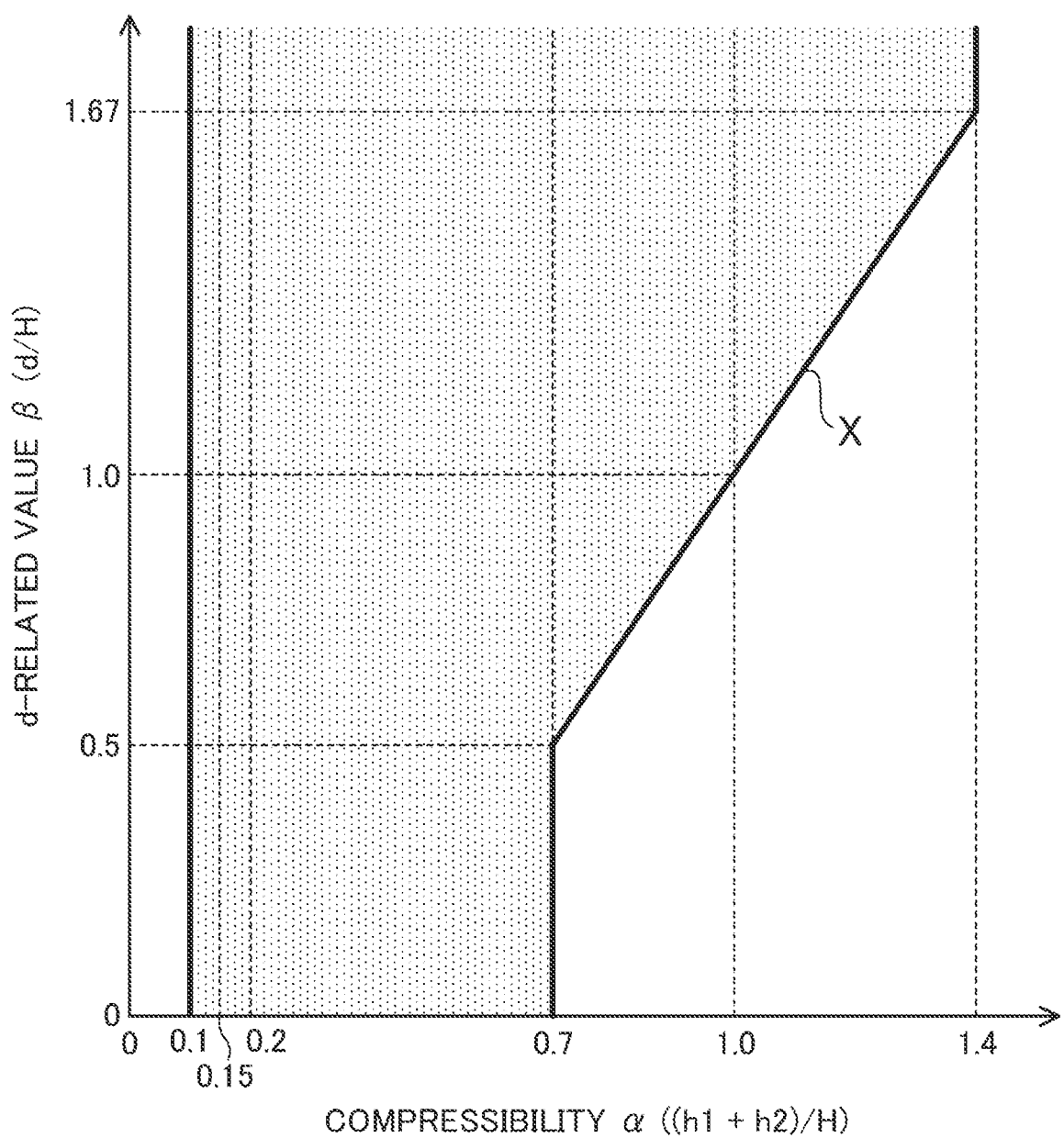
FIG. 21 illustrates the relation between the compressibility $\alpha$ and the d-related value $\beta$.

The relation between the compressibility α and the d-related value β is shown in FIG. 21, based on the results obtained by the simulations of the first to fifth experimental examples.

In a range of the compressibility α of from 0.1 to 0.7, the d-related value β merely needs to be greater than or equal to 0. In a range of the compressibility α exceeding 0.7 and lower than or equal to 1.4, the d-related value β merely needs to be a value on, or above, the straight line indicated by the character X in FIG. 21. The straight line X is expressed by β=0.5+5 (α−0.7)/3=(5α−2)/3. In summary, an allowable range of the values α and β corresponds to the range indicated by the following formula (2), i.e., a dotted range of FIG. 21.

Expression 3

$$\left.\begin{array}{l}0.1 \leq \alpha \leq 0.7, \ \beta \geq 0 \\ 0.7 < \alpha \leq 1.4, \ \beta \geq (5\alpha-2)/3\end{array}\right\} \quad (2)$$

To reduce the influence of tolerance and errors in the assembly process, a higher value of the compressibility α is preferable. The compressibility α is preferably higher than or equal to 0.15 and more preferably higher than or equal to 0.2. To reduce the maximum principal strain, a lower value of the compressibility α is preferable. The compressibility α is preferably lower than or equal to one.

As described above, the pressing force is less than or equal to 1 kN in one preferred embodiment. Referring to FIG. 20, in the fifth experimental example in which the compressibility α is one, the pressing force is about 1 kN or exceeds 1 kN, irrespective of the d-related value β. In the fourth experimental example in which the compressibility α is 0.8, the pressing force is below 1 kN irrespective of the d-related value β. To reduce the pressing force, the compressibility α is lower than or equal to 0.8 in one preferred embodiment. To reduce the maximum principal strain and the pressing force, the compressibility α is more preferably lower than or equal to 0.7.

Referring to FIGS. 18 and 19, the sealing surface pressure and the maximum principal strain tend to be more stable with an increase in the d-related value β. To reduce the influence of tolerance and errors in the assembly process and secure the stability of the whole design, the d-related value β is preferably 0.5 or more, and more preferably 1.0 or more. The d-related value β should not be limited, but is preferably 10 or less in consideration of the balance between the size of the electrode (11) and the functions of the first and second projections (51) and (52). The d-related value β is more preferably 5 or less in consideration of compactness of the polymer molding (3) in addition to the balance described above.

Advantages of Second Embodiment

The sealing structure (10a) of the lithium ion battery (10) of this embodiment includes the metal lid (2) having the through hole (2a). The sealing structure (10a) includes the polymer molding (3) having the tube portion (3a) and the base portion (3b). The tube portion (3a) is provided along the entire edge (2b) of the through hole (2a). The base portion (3b) is provided on the tube portion (3a). The sealing structure (10a) includes the electrode (11) having the column portion (11a) and the plate portion (11b). The column portion (11a) is disposed on the inner periphery (3g) of the tube portion (3a). The plate portion (11b) is provided on the column portion (11a). The back surface (2c) of the metal lid (2) is in contact with the front surface (3e) of the base portion (3b) of the polymer molding (3). The front surface (11c) of the plate portion (11b) of the electrode (11) is in contact with the back surface (3f) of the base portion (3b) of the polymer molding (3). The back surface (2c) of the metal lid (2) has the annular first projection (51) provided around the through hole (2a) and projecting toward the base portion (3b) of the polymer molding (3). The front surface (11c) of the plate portion (11b) of the electrode (11) has the annular second projection (52) provided around the through hole (2a) and projecting toward the base portion (3b) of the polymer molding (3). The values α and β expressed by the following formula (1) satisfy the following formula (2), where h1 and h2 respectively represent the heights of the first and second projections (51) and (52), d represents the distance between the first and second projections (51) and (52), and H represents the thickness of the base portion (3b) of the polymer molding (3).

$$\alpha = (h1+h2)/H, \beta = d/H \quad (1)$$

Expression 4

$$\left.\begin{array}{l} 0.1 \leq \alpha \leq 0.7, \ \beta \geq 0 \\ 0.7 < \alpha \leq 1.4, \ \beta \geq (5\alpha - 2)/3 \end{array}\right\} \quad (2)$$

Setting the values α and β within the associated regions indicated by the foregoing formula (2) allows the sealing structure (10a) to have sufficient sealing properties and sufficient durability enough to withstand long-term use.

In the sealing structure (10a) according to this embodiment, the values α and β satisfy preferably the following formula (3), more preferably the following formula (4) or (5), still more preferably the following formula (6), and yet more preferably the following formula (7), in one preferred embodiment. This allows the sealing structure (10a) to have sufficient sealing properties and sufficient durability even after a lapse of 10 years.

Expression 5

$$\left.\begin{array}{l} 0.1 \leq \alpha \leq 0.7, \ \beta \geq 0.5 \\ 0.7 < \alpha \leq 1.0, \ \beta \geq (5\alpha - 2)/3 \end{array}\right\} \quad (3)$$

$$0.1 \leq \alpha \leq 0.7, \beta \geq 1.0 \quad (4)$$

$$0.15 \leq \alpha \leq 0.7, \beta \geq 0.5 \quad (5)$$

$$0.2 \leq \alpha \leq 0.7, 0.5 \leq \beta \leq 10 \quad (6)$$

$$0.2 \leq \alpha \leq 0.7, 1.0 \leq \beta \leq 5 \quad (7)$$

Other Embodiments

Use of the sealing structure (10a) is not limited to use for lithium ion batteries. The sealing structure (10a) can also be used for secondary batteries other than lithium ion batteries, such as lead acid batteries, nickel-cadmium batteries, sodium-sulfur batteries, and sodium ion batteries. The sealing structure (10a) is suitable for a nonaqueous electrolyte secondary battery.

The raw material of the polymer molding (3) (PFA) is merely an example. A fluoric resin except PFA may be used. A composition of a resin of a different type from the fluoric resin and a polymer may also be used as the raw material of the polymer molding (3). Examples of the fluoric resin include, in addition to the PFA, polytetrafluoroethylene (PTFE), a tetrafluoroethylene-hexafluoroethylene copolymer (FEP), an ethylene-tetrafluoroethylene copolymer (ETFE), a tetrafluoroethylene-chlorotrifluoroethylene-perfluorovinylether copolymer, an ethylene-tetrafluoroethylene-hexafluoropropylene copolymer, polyvinylidene fluoride (PVDF), and a vinylidene fluoride-tetrafluoroethylene-hexafluoroethylene copolymer. Examples of the composition of resin of a different type from the fluoric resin and a polymer include a polyethylenic resin, a polyamide resin, a polyesteric resin, a polyurethanic resin, and rubbers. Examples of the polyethylenic resin include linear low density polyethylene (LLDPE), low density polyethylene (LDPE), high density polyethylene (HDPE), and an ethylene-vinylacetate copolymer (EVA). Examples of the polyamide resin include PA6, PA12, and PA66. Examples of the polyesteric resin include polyethylene terephthalate (PET) and polybutylene terephthalate (PBT). Examples of the rubbers include a butyl rubber (isobutylene-isoprene rubber (IIR)), an ethylene-propylene rubber (EPM), an ethylenepropylene-diene rubber (EPDM), an urethane rubber (U), a silicone rubber (Si, Q), and a fluororubber (FKM). One or two types of the above-listed examples of the composition of the resin and polymer can be used as the raw material of the polymer molding (3).

In one preferred embodiment, the raw material of the polymer molding (3) is a composition of a non-adhesive resin and a non-adhesive polymer.

To improve the durability of the seal (1), it is recommended that the "elongation at break" of the raw material for the polymer molding (3) be preferably 150% or more and more preferably 200% or more.

The shape of the metal lid (2) should not be limited to a disk shape, and the shape of the through hole (2a) should not be limited to a circular shape. For example, the metal lid (2) may have a rectangular outer shape.

The through hole (2a) of the metal lid (2) may be, for example, rectangular. In this case, the polymer molding (3) is also rectangular as viewed in the through direction (A).

Although the metal lid (2) is exemplified as the member (2), the metal lid (2) may be replaced with a member made of a material except metal. For example, a resin lid may be used.

Although aluminum is exemplified as the material of the metal lid (2), the material of the metal lid (2) may be appropriately selected in accordance with the use of the sealing structure (10a) and other elements. Examples of the material of the metal lid (2) include, in addition to aluminum described above, metals, such as an aluminum alloy, copper, a copper alloy, iron, stainless steel, and nickel.

Figure 22:
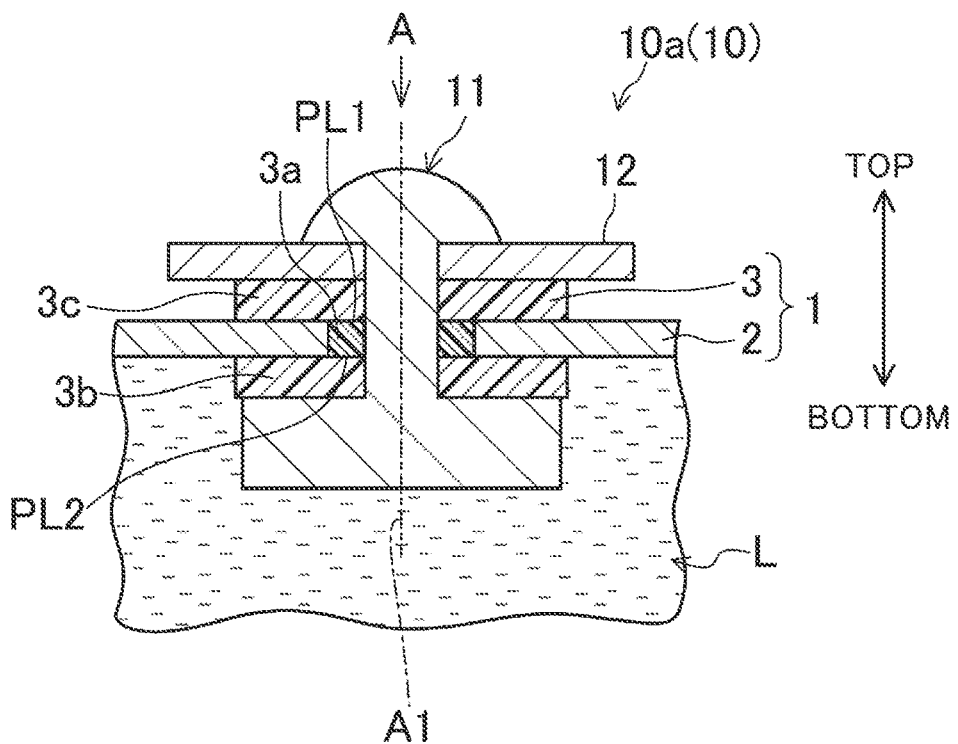
FIG. 22 illustrates a sealing structure according to another embodiment, and corresponds to FIG. 1.
Figure 23:
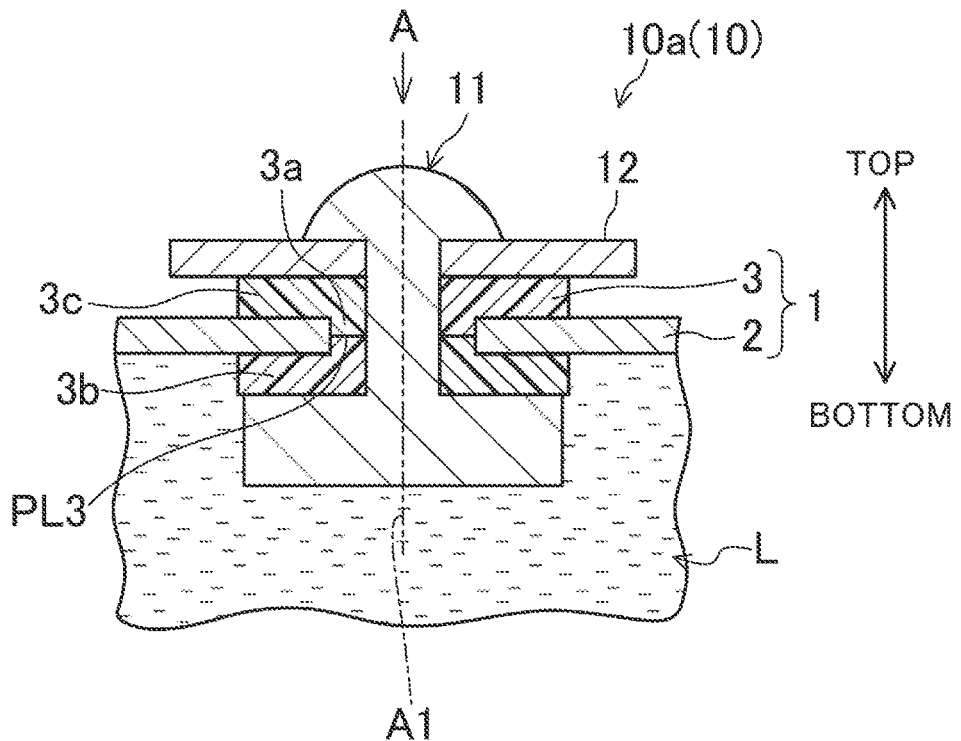
FIG. 23 illustrates a sealing structure according to still another embodiment, and corresponds to FIG. 1.

The seal (1) may be manufactured by a method other than insert molding. The metal lid (2) and the polymer molding (3) do not have to be an integrally molded article. The polymer molding (3) may have a split structure. FIGS. 22 and 23 show examples of the split structure. A polymer molding (3) illustrated in FIG. 22 has a tube portion (3a), a base portion (3b), and an upper portion (3c) separated from one another at splitting planes (PL1, PL2), and thus includes three parts. A polymer molding (3) illustrated in FIG. 23 has its tube portion (3a) split at a splitting plane (PL3), and thus includes two parts. The two parts include a part including a lower portion of the tube portion (3a) and a base portion (3b), and a part including an upper portion of the tube portion (3a) and an upper portion (3c). The polymer molding (3) having a split structure may have a plurality of parts separated from one another and made of different materials. This can broaden the range of variations of the polymer molding. The plurality of separated parts may be in a non-bonded state, or in a bonded state, at the associated splitting planes.

The projection (51) of the first embodiment may be formed on the front surface (11c) of the plate portion (11b) of the electrode (11). A plurality of projections (51) may be formed on either or both of the back surface (2c) of the metal lid (2) and the front surface (11c) of the plate portion (11b) of the electrode (11). The second embodiment is an example in which the projections (51) (the first and second projections (51) and (52)) are formed on the back surface (2c) of the metal lid (2) and the front surface (11c) of the plate portion (11b) of the electrode (11), respectively. In the second embodiment, as illustrated in FIG. 14, the first projection (51) is disposed outside the second projection (52) in the radial direction (B). However, the first projection (51) may be disposed inside the second projection (52) in the radial direction (B).

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure.

The present disclosure is useful for a sealing structure for a battery.

The invention claimed is:

1. A sealing structure for a battery, the sealing structure comprising:
   a plate shaped member having a through hole;
   a polymer molding having a tube portion and a base portion, the tube portion being provided along an entire edge of the through hole, and the base portion being provided on the tube portion; and
   an electrode having a column portion and a plate portion, the column portion being disposed on an inner periphery of the tube portion, and the plate portion being provided on the column portion,
   a back surface of the plate shaped member being in contact with a front surface of the base portion of the polymer molding,
   a front surface of the plate portion of the electrode being in contact with a back surface of the base portion of the polymer molding,
   the back surface of the plate shaped member having an annular first projection provided around the through hole and projecting toward the base portion of the polymer molding,
   the front surface of the plate portion of the electrode having an annular second projection provided around the through hole and projecting toward the base portion of the polymer molding,
   values $\alpha$ and $\beta$ being expressed by the following formula (1)

$$\alpha=(h1+h2)/H, \beta=d/H \qquad (1), \text{and}$$

values $\alpha$ and $\beta$ satisfying the following formula (2)

$$\left.\begin{array}{l}0.1 \leq \alpha \leq 0.7, \ \beta \geq 0 \\ 0.7 < \alpha \leq 1.4, \ \beta \geq (5\alpha - 2)/3\end{array}\right\} \qquad (2)$$

where h1 and h2 respectively represent heights of the first and second projections, d represents a distance between the first and second projections, and H represents a thickness of the base portion of the polymer molding.

2. The sealing structure of claim 1, wherein the values $\alpha$ and $\beta$ satisfy the following formula (3)

$$\left.\begin{array}{l}0.1 \leq \alpha \leq 0.7, \ \beta \geq 0.5 \\ 0.7 < \alpha \leq 1.0, \ \beta \geq (5\alpha - 2)/3\end{array}\right\} \qquad (3)$$

3. The sealing structure of claim 2, wherein the values $\alpha$ and $\beta$ satisfy the following formula (4)

$$0.1 \leq \alpha \leq 0.7, \beta \geq 1.0 \qquad (4).$$

4. The sealing structure of claim 2, wherein the values $\alpha$ and $\beta$ satisfy the following formula (5)

$$0.15 \leq \alpha \leq 0.7, \beta \geq 0.5 \qquad (5).$$

5. The sealing structure of claim 4, wherein the values $\alpha$ and $\beta$ satisfy the following formula (6)

$$0.2 \leq \alpha \leq 0.7, 0.5 \leq \beta \leq 10 \qquad (6).$$

6. The sealing structure of claim 5, wherein the values $\alpha$ and $\beta$ satisfy the following formula (7)

$$0.2 \leq \alpha \leq 0.7, 1.0 \leq \beta \leq 5 \qquad (7).$$

7. The sealing structure of claim 1, wherein a raw material of the polymer molding is a fluoric resin.
8. The sealing structure of claim 1, wherein the battery is a lithium ion battery.
9. The sealing structure of claim 2, wherein a raw material of the polymer molding is a fluoric resin.
10. The sealing structure of claim 3, wherein a raw material of the polymer molding is a fluoric resin.
11. The sealing structure of claim 4, wherein a raw material of the polymer molding is a fluoric resin.
12. The sealing structure of claim 5, wherein a raw material of the polymer molding is a fluoric resin.
13. The sealing structure of claim 6, wherein a raw material of the polymer molding is a fluoric resin.
14. The sealing structure of claim 2, wherein the battery is a lithium ion battery.
15. The sealing structure of claim 3, wherein the battery is a lithium ion battery.
16. The sealing structure of claim 4, wherein the battery is a lithium ion battery.
17. The sealing structure of claim 5, wherein the battery is a lithium ion battery.
18. The sealing structure of claim 6, wherein the battery is a lithium ion battery.
19. The sealing structure of claim 7, wherein the battery is a lithium ion battery.

\* \* \* \* \*